(12) United States Patent
Arima et al.

(10) Patent No.: US 8,645,549 B2
(45) Date of Patent: Feb. 4, 2014

(54) SIGNAL RELAY METHOD AND RELAY SERVER PERFORMING A RELAY OPERATION BETWEEN A PLURALITY OF FIRST TERMINALS AND A SECOND TERMINAL VIA A NETWORK

(75) Inventors: Yuji Arima, Fukuoka (JP); Kazuo Imafuku, Fukuoka (JP); Yuji Mitsunaga, Fukuoka (JP)

(73) Assignee: Panasonic Corporation, Osaka (JP)

( * ) Notice: Subject to any disclaimer, the term of this patent is extended or adjusted under 35 U.S.C. 154(b) by 228 days.

(21) Appl. No.: 13/175,323

(22) Filed: Jul. 1, 2011

(65) Prior Publication Data

US 2011/0264811 A1  Oct. 27, 2011

Related U.S. Application Data

(62) Division of application No. 12/274,957, filed on Nov. 20, 2008, now abandoned.

(30) Foreign Application Priority Data

Nov. 20, 2007 (JP) .................................. 2007-300134
Jun. 10, 2008 (JP) .................................. 2008-151259

(51) Int. Cl.
  *G06F 15/16* (2006.01)
(52) U.S. Cl.
  USPC ........... 709/227; 709/228; 709/229; 709/231; 709/237
(58) Field of Classification Search
  USPC ......................................................... 709/227
  See application file for complete search history.

(56) References Cited

U.S. PATENT DOCUMENTS 6,076,128 A * 6/2000 Kamijo et al. ................ 710/312
6,651,053 B1 11/2003 Rothschild
6,961,783 B1 11/2005 Cook
(Continued)

FOREIGN PATENT DOCUMENTS

EP        1868354     12/2007
JP       9/261522     10/1997
(Continued)

OTHER PUBLICATIONS

International Search Report dated Apr. 21, 2009.
(Continued)

Primary Examiner — Andrew Georgandellis
Assistant Examiner — Arvin Eskandarnia
(74) Attorney, Agent, or Firm — Dickinson Wright PLLC

(57) ABSTRACT

The present invention has an object to provide a server apparatus capable of accessing a terminal apparatus connected via an IP network to a router from an externally provided terminal apparatus in a simple and firm manner without previously performing complex setting operation.
A server apparatus of the present invention is comprised of: a connection information transmitting unit, when specific information of a second terminal apparatus connected via a router to an IP (Internet Protocol) network is received from a first terminal apparatus connected via the IP network to the connection information transmitting unit, which transmits connection information to the first terminal apparatus, the connection information being employed so as to access the second terminal apparatus from the first terminal apparatus; and a relay unit, when the relay unit is accessed from the first terminal apparatus by employing the connection information transmitted by the connection information transmitting unit, which relays the first terminal apparatus to the second terminal apparatus having the specific information.

8 Claims, 17 Drawing Sheets

(56) References Cited

U.S. PATENT DOCUMENTS

| | | |
|---|---|---|
| 2002/0188714 A1 | 12/2002 | Bouthors |
| 2003/0037293 A1* | 2/2003 | Owhadi ............... 714/46 |
| 2003/0084152 A1* | 5/2003 | Chung ............... 709/225 |
| 2004/0044778 A1 | 3/2004 | Alkhatib |
| 2005/0015584 A1 | 1/2005 | Takechi et al. |
| 2005/0041596 A1 | 2/2005 | Yokomitsu |
| 2005/0044258 A1* | 2/2005 | Nakamura ............. 709/232 |
| 2005/0091333 A1 | 4/2005 | Kobayashi |
| 2006/0006238 A1* | 1/2006 | Singh ............... 235/462.46 |
| 2006/0036858 A1* | 2/2006 | Miura et al. ............. 713/170 |
| 2006/0114873 A1* | 6/2006 | Fujii et al. ............. 370/338 |
| 2006/0161639 A1 | 7/2006 | Kato |
| 2007/0200914 A1 | 8/2007 | DuMas |
| 2007/0298835 A1* | 12/2007 | Uehara et al. ............. 455/552.1 |
| 2008/0016537 A1* | 1/2008 | Little et al. ............. 725/81 |

FOREIGN PATENT DOCUMENTS

| | | |
|---|---|---|
| JP | 2002/101407 | 4/2002 |
| JP | 2002/141953 | 5/2002 |
| JP | 2004-040272 | 2/2004 |
| JP | 2004-120547 | 4/2004 |
| JP | 2005/33250 | 2/2005 |
| JP | 2005-063365 | 3/2005 |
| JP | 2005-236728 | 9/2005 |
| JP | 2005/210583 | 8/2006 |
| WO | 2004/075479 | 9/2004 |
| WO | 2005/081492 | 9/2005 |

OTHER PUBLICATIONS

Japanese Notification of Reason for Refusal dated Aug. 17, 2010.

* cited by examiner

SIGNAL RELAY METHOD AND RELAY SERVER PERFORMING A RELAY OPERATION BETWEEN A PLURALITY OF FIRST TERMINALS AND A SECOND TERMINAL VIA A NETWORK

This is a divisional application of application Ser. No. 12/274,957 filed Nov. 20, 2008, which is based on Japanese Application No. 2007-300134 filed Nov. 20, 2007 and Japanese Application No. 2008-151259 filed Jun. 10, 2008, the entire contents of each which are incorporated by reference herein.

BACKGROUND

1. Field of the Invention

The present invention is related to a server apparatus that is interposed in communications performed among a plurality of terminal apparatuses connected to each other via an IP network such as the Internet.

2. Description of the Related Art

Conventionally, for example, images photographed by indoor network cameras have been confirmed via the Internet from externally provided portable terminals (terminal apparatuses) (refer to, for example, patent publication 1). In such systems, the indoor network cameras are connected to routers, and the routers are connected to WANs (Wide Area Networks) such as the Internet. FIG. 17 shows one conventional system structural diagram of network terminals and network cameras.

As represented in FIG. 17, a global IP address (for example, 43.251.231.100) has been allocated as an IP address to a router, and at the same time, a private IP address (for example, 192.168.1.1) has been allocated to this router. Furthermore, private IP addresses have been allocated to network cameras under management by the above-described router. For example, in such a case that 3 sets of network cameras have been connected to the single router, as private IP addresses, "192.168.1.251" has been allocated to the first network camera; "192.168.1.252" has been allocated to the second network camera; and "192.168.1.253" has been allocated to the third network camera, respectively.

Then, within a WAN, when the above-described global IP address is used, this router can be identified. However, the network cameras under management of the router cannot be viewed from the side of the WAN. Conversely, in a LAN (Local Area Network) under management of this router, for example, the respective network cameras provided within the LAN can be accessed from a personal computer PC by utilizing the private IP addresses. However, the personal computer PC cannot access any network appliances provided on the side of the WAN by utilizing private IP addresses. As previously explained, within each of the WAN and the LAN, network appliances belonging to either the WAN or the LAN may be connected to each other by using either the global IP address or the private IP addresses. However, since there is no direct relationship between two IP addresses (namely, global IP address and private IP addresses), connections between both network appliances cannot be simply carried out. As a consequence, technical ideas such as the NAT (Network Address Translator) are necessarily required, which will be described later.

First of all, the reason why global IP addresses cannot be allocated to all of terminals in this case will now be described. The routing protocol of IP (Internet Protocol) under use in the Internet presently corresponds to the 32-bit IPv4, and since global IP addresses are utilized all over the world, these global IP addresses are under exhausted condition. In order to solve this exhausted condition, the 128-bit IPv6 has been proposed as the next generation global IP addresses. It takes more, or less time in order to transfer the 32-bit IPv4 to the 128-bit IPv6. In addition, considering such an aspect that security as to appliances provided in LANs when these appliances are connected to WANs can be easily secured and also these appliances can be easily operated, there are some merits in network systems operable based upon the protocol IPv4 by interposing routers. As a consequence, there are great possibilities that presently available connection modes of the routing protocol IPv4 may be utilized for the time being, so that IP terminal apparatuses such as network cameras may be effectively utilized until near future.

In such a case that an externally provided portable terminal accesses a network camera, the portable terminal can merely access only such a router to which a global IP address has been allocated, for instance, the global IP address of "43.251.231.100" in the above-explained example. In other words, the portable terminal cannot directly access the network camera. As a consequence, this portable terminal once accesses the above-described router to which the global IP address has been allocated, and thereafter, the portable terminal must request this router to be connected to the network camera.

As previously described, in such a case that a plurality of terminals have been connected to the router having the global IP address "43.251.231.100", these plural terminals can be accessed from a portable terminal provided on the side of WAN by employing this commonly-used global IP address "43.251.231.100." However, in order that the above-described portable terminal is connected to one terminal among the plurality of terminals connected to the router, by utilizing only the global IP address allocated to the router this terminal cannot be specified. Accordingly, this problem may be solved by furthermore applying a port number to the specific terminal, which is different from the global IP address.

For instance, with respect to the network camera having the private IP address "192.168.1.251" connected to the router, a port number "50002" is allocated thereto, as viewed from the WAN side; a port number "50001" is allocated to the network camera having the private IP address "192.168.1.252"; and another port number "5000" is allocated to the network camera having the private IP address "192.168.1.253." Then, while the correspondence table with respect to the private IP addresses and the port numbers has been previously registered in the router, port forwarding operation is executed by referring to the correspondence table while utilizing a so-called "NAT (network Address Translator)", or an IP masquerade equipped with a dynamic correspondence table.

As previously explained, the individual port numbers are allocated to the respective plural terminal apparatuses by utilizing either the NAT technique or the IP masquerade technique, and any one of these individual port numbers is utilized in combination with the global IP address commonly applied to the router. As a result, even when there is only one global IP address, any one of these plural terminal apparatuses under management of the router can be specified to be accessed.

However, in accordance with the above-described NAT technique, the same terminal apparatus (for example, same network camera) that is connected to the WAN cannot be simultaneously accessed by the plural terminal apparatuses provided within the LAN. This reason is given as follows: That is, with respect to communications between the router and the terminal apparatuses of the WAN, more than 1 session cannot be established. To the contrary, this problem may be dynamically solved if the IP masquerade technique is employed, so that the same terminal apparatus provided in the WAN can be simultaneously accessed from the plural terminal apparatuses. However, in this communication method based upon the IP masquerade technique, if such a connecting process that the terminal apparatus of the WAN side is firstly connected from the plurality of terminal apparatuses (namely, network cameras provided in LAN) connected to the router is not conducted, then the terminal apparatuses provided inside the LAN cannot be communicated with the terminal apparatus provided on the WAN side, while the connection is newly established.

A method for firstly starting a communication from the WAN side with respect to a network camera provided within a LAN by using the IP masquerade technique has not yet been proposed in the present stage. Although there are some possibilities that a server, or the like are initiated within a LAN, in order that the server provided in this LAN can be accessed from the WAN side, both a private IP address and a port number of this server must be previously registered in a correspondence table of the router by a user in a manual manner. In order to register these private IP address and port number in the correspondence table, the user firstly must know the IP address of the router, and also, the user is necessarily required to grasp an ID and a password, which are utilized so as to access the router. After the above-described initial condition has been established, the user accesses the router, and then, is required to enter the private IP address and the port number of the server, resulting in very cumbersome works. Also, when the server is accessed from the WAN side, the user must designate the global IP address of the router and the port number of the server, which also conducts a cumbersome work. Moreover, there are some possibilities that the global IP address of the router may be changed. As a consequence, if the global IP address of the router is changed, then the server cannot be accessed even when the old global IP address is used. Accordingly, certainty may be deteriorated.

Also, a communication relay apparatus has been proposed which is connected to such network connection appliances as a router and a gateway (Patent publication 2). However, a registration request must be transmitted from an IP terminal to the communication relay apparatus. The above-described registration request is constructed by employing a private address, a terminal name, a terminal attribute, a service name, a service attribute, a port number, and the like. Accordingly, this conventional communication relay apparatus has a similar problem to the above-described conventional technique (Patent publication 1).

As a consequence, the applicant of the present invention has also proposed the router capable of performing the dynamic forward setting operation based upon the UPnP standard (Patent publication 3). However, this conventional technique similarly constitute such a limited solution that the communicating operation may be merely carried out only via the router equipped with the dynamic port forward function of the UPnP standard.

Patent Publication 1: JP-A-2005-210583
Patent Publication 2: JP-A-2002-141953
Patent Publication 3: JP-A-2005-33250

SUMMARY

As a consequence, by considering the above-described problems the present invention has been made, and therefore, has an object to provide a server apparatus capable of simply and firmly accessing a terminal apparatus connected via an IP network to a router from an externally provided terminal apparatus.

In order to solve the above-described problems, a server apparatus, according to the present invention, is featured by comprising: a connection information transmitting unit which transmits, when specific information of a second terminal apparatus coupled via a router to an IP (Internet Protocol) network is received from a first terminal apparatus coupled via the IP network to the connection information transmitting unit, connection information to the first terminal apparatus, the connection information being employed so as to access the second terminal apparatus from the first terminal apparatus; and a relay unit which performs, when the relay unit is accessed from the first terminal apparatus by employing the connection information transmitted by the connection information transmitting unit, a relay operation between the first terminal apparatus and the second terminal apparatus having the specific information.

In accordance with the server apparatus of the present invention, when the specific information of the second terminal apparatus is received from the first terminal apparatus, the connection information for accessing the second terminal apparatus from the first terminal apparatus is transmitted by the connection information transmitting unit; and when the second terminal apparatus is accessed from the first terminal apparatus by employing the connection information transmitted by the connection information transmitting unit, the first terminal apparatus is relayed to the second terminal apparatus having the specific information. As a result, the second terminal apparatus can be firmly accessed from the first terminal apparatus.

DETAILED DESCRIPTION

Embodiment Mode 1

A description is made of a server apparatus and a terminal apparatus, according to an embodiment mode 1 of the present invention. The terminal apparatus of the embodiment mode 1 is a network camera, while plural sets of network cameras have been connected to a router connected to an IP network. In the below-mentioned descriptions, although network cameras will be explained as the terminal apparatuses, if communication appliances functioning as servers are available which are connected to networks, then any other communication appliances may be employed as the above-described terminal apparatuses. Also, a program of the embodiment mode 1 implies such a program that may cause a computer mounted on the terminal apparatus to sequentially execute the below-explained sequential operations.

Figure 1:
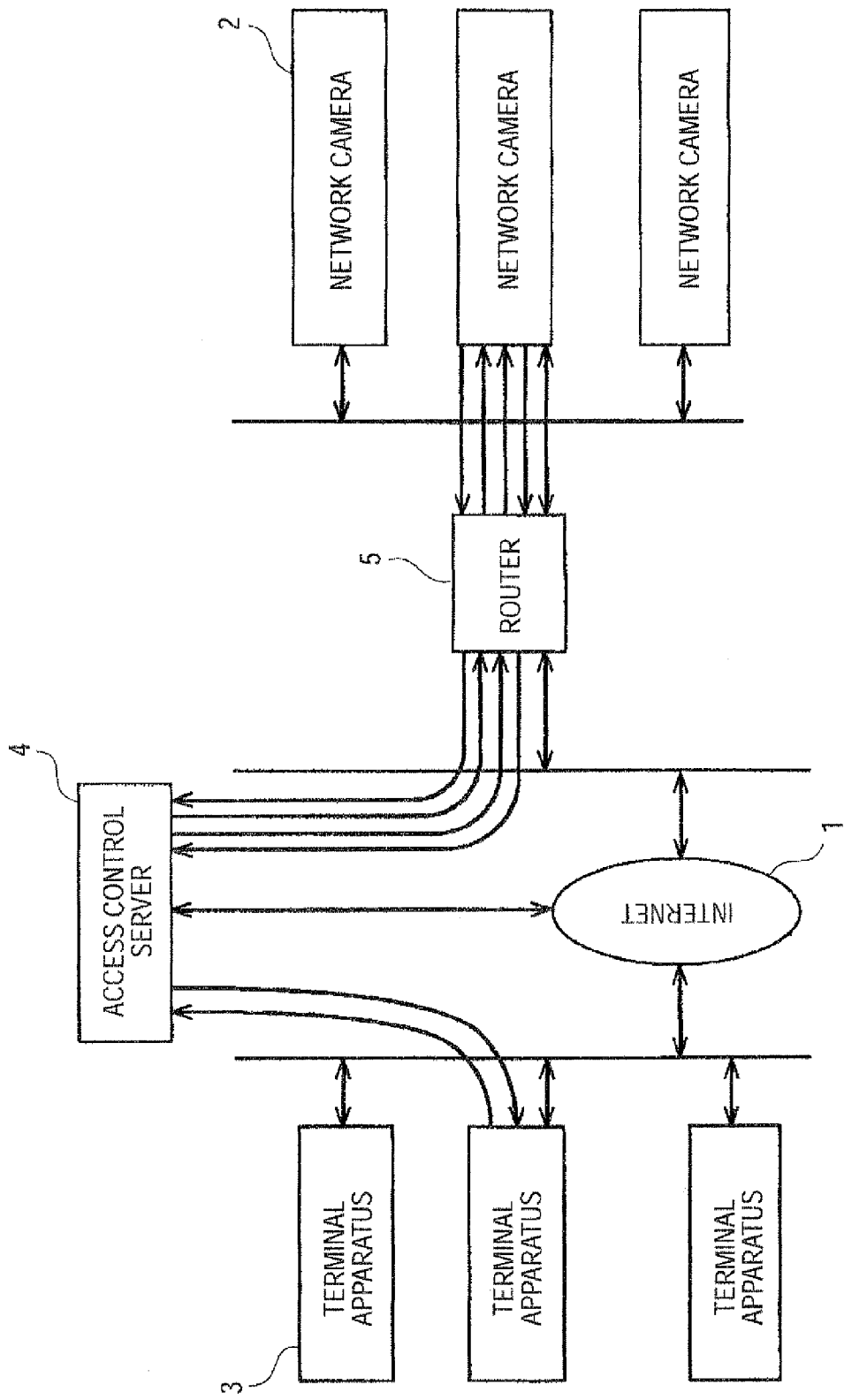
FIG. 1 is a structural diagram of a network system in which a communication operation is carried out via a server apparatus according to an embodiment mode 1 of the present invention.

In FIG. 1, an IP network 1 corresponds to such a network as the Internet where a communicating operation is performed based upon protocols of TCP/IP, and an intranet. A terminal apparatus 3 (first terminal apparatus of the present invention) such as a portable telephone is connected to the IP network 1, and also, a router 5 is connected to the IP network 1. A plurality of network cameras 2 (second terminal apparatus of the present invention) are connected to the downstream side of this router 5 and are operated under management of the router 5. The network cameras 2 record images photographed by camera units, and then, transmit the recorded images to the IP network 1.

While this network camera 2 has equipped with an image server, the network camera 2 distributes images by utilizing the protocol of HTTP. Alternatively, either images or moving pictures (video data) may be distributed by using other protocols, for instance, the protocols of FTP, SMTP, and RTP. Then, the router 5 has contained a global IP address, and the respective network cameras 2 have contained external port numbers.

Also, as shown in FIG. 1, an access control server 4 (sever apparatus of the present invention) capable of causing the terminal apparatuses 3 to access the network cameras 2 is connected to the IP network 1.

Under the above-described environment shown in FIG. 1, when user information and specific information are notified from the terminal apparatus 3 so as to require registration of the user information and the specific information, in such a case that the user information of the specific terminal apparatus 3 and the specific information of the network camera 2 have not yet been stored, the access control server 4 registers plural pieces of the above-described information (namely, user information and specific information.) The user information corresponds to a user ID, a password designated by a user, and the like. The specific information is capable of identifying the specific network camera 2 based upon a bar code, a QR code, and the like. These user information and specific information are registered in a connection information database of a setting information storage unit 44 of the access control server 4. It should be understood that if the above-explained specific information is constituted by a MAC address, a serial number (appliance manufacturing number), and the like of the specific network camera 2, this specific information is preferable, since other unique information need not be newly applied in addition to these user information and specific information.

After the access control server 4 has registered these user information and specific information, the access control server 4 notifies a URL (Uniform Resource Locator) for accessing the specific network camera 2 to the terminal apparatus 3. As will be discussed later, the terminal apparatus 3 can access the specific network camera 2 by utilizing the notified URL. As previously described, in the terminal apparatus 3, while a global IP address of the router 5 and a port number of the specific network camera 2 are not entered, the terminal apparatus 3 directly uses the URL transmitted from the access control server 4 so as to access the specific network camera 2, so that the accessing operation can be carried out in a simple manner. Also, the URL does not depend upon the global IP address of the router 5 and the port number of the network camera 2, even when the global IP address of the router 5 is changed, the terminal apparatus 3 can access the specific network camera 2 by utilizing the same URL, so that the accessing operation can be firmly carried out.

Next, a description is made of operations when either a network camera 2 has not yet set up or has already been set up is connected as indicated by arrows of FIG. 1. In such a case that the relevant network camera 2 has not yet been set up, this network camera 2 notifies such a status that the own network camera 2 has not yet been set up, namely, a status indicative of factory shipment condition, and also, notifies the above-described specific information constructed by containing the MAC address and the serial number. In the case that the relevant network camera 2 has already been set up, this network camera 2 notifies the present status (status indicative of setup condition) in combination with the specific information.

In contrast to the above-described operation, the access control server 4 retrieves the content of the connection information database of the setting information storage unit 44 by using the transmitted specific information, and then, notifies a response signal (200 OK) to the specific network camera 2 if this specific information has been registered. Then, furthermore, the access control server 4 transmits this camera setting information (user information and specific information of terminal apparatus 3) to the specific network camera 2 so as to instruct a setup operation.

After the setup operation, a session establishment (connection) request is transmitted from the relevant network camera 2 to the access control server 4 in a periodic manner. A session implies a connection for establishing a communicating operation. In contrast thereto, the access control server 4 transmits the response signal (200 OK) to the relevant network camera 2 so as to bring the relevant network camera 2 into a connection status. This connection is maintained for a predetermined time by utilizing "Keep Alive with connection confirmation time." When this connection confirmation time has elapsed, this sequential operation is repeatedly carried out. While the relevant network camera 2 is under connection status, if an image transmission is required from the terminal apparatus 3 by using the above-described URL from the terminal apparatus 3, then the image is transmitted from the relevant network camera 2 via the access control server 4 to the terminal apparatus 3.

It should also be noted that the access control sever 4 of the embodiment mode 1 can establish a communication-purpose secession of a first line between the network camera 2 and the own access control server 4, and in addition, can establish a second session of a second line, or more lines. When the access control server 4 transmits, for example, a camera control request of panning operation to the relevant network camera 2 by way of the second session, the access control sever 4 transmits the camera control request to the relevant network camera 2 by using this second session. After the relevant network camera 2 has been controlled, this network camera 2 transmits a camera control completion notification to the access control server 4, and then, the access control server 4 transmits the camera control completion notification to the terminal apparatus 3. As a result, the terminal apparatus 3 of the embodiment mode 1 can acquire the images from the network camera 2, and at the same time, can control the network camera 2 via a separate line.

Figure 2:
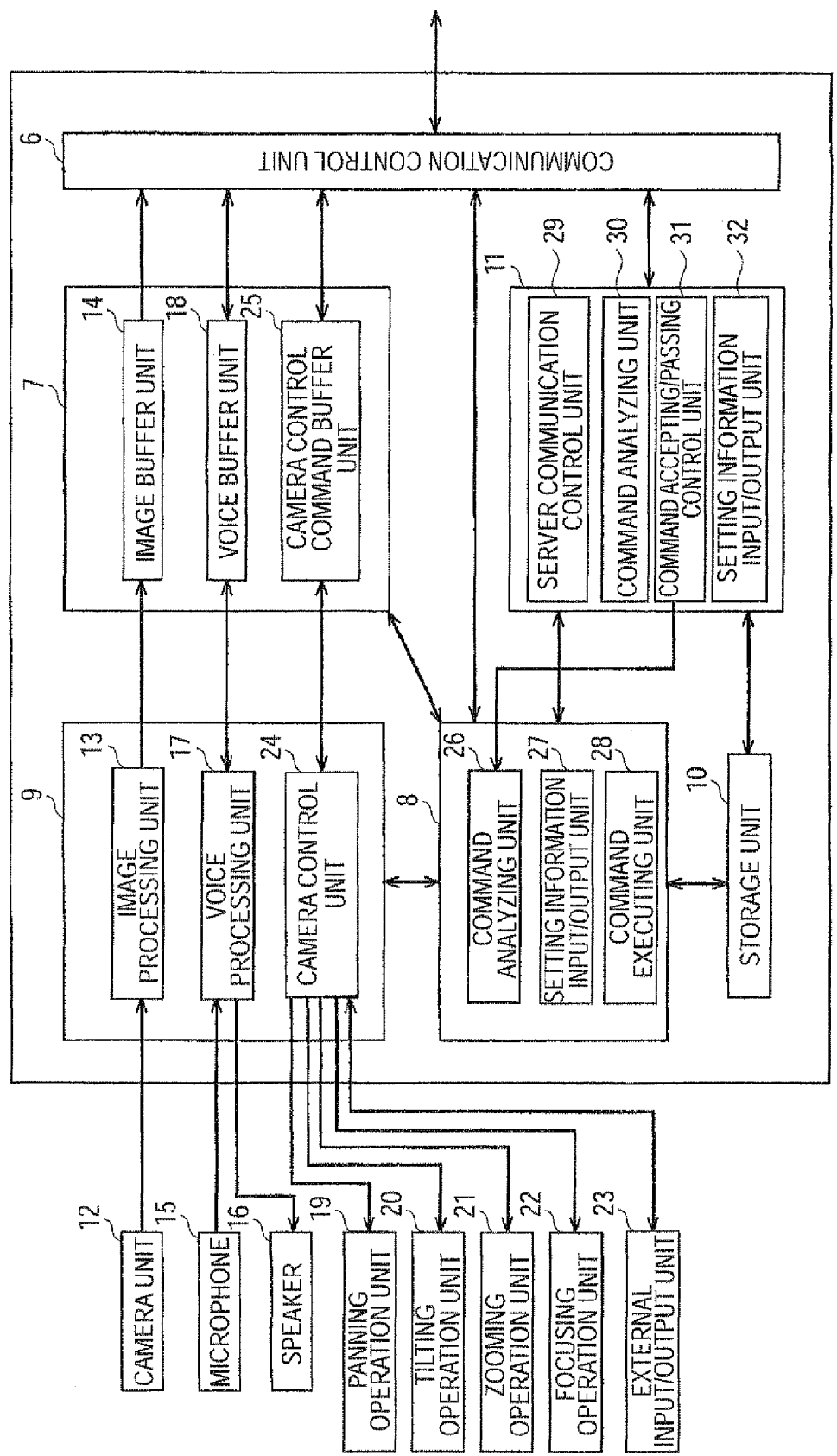
FIG. 2 is a block diagram for showing a network camera employed in the embodiment mode 1 of the present invention.

A detailed description is made of an internal arrangement of any one of the network cameras 2 with reference to FIG. 2. A basic arrangement of this one network camera 2 will be firstly explained, and subsequently, a concrete arrangement thereof will be described. In the network camera 2 shown in FIG. 2, a communication control unit 6 to be connected to the router 6 has been provided, and the communication control unit 6 performs a communicating operation based upon such a protocol as the TCP/IP protocol as an interface. Data such as voices and commands that have been acquired by performing communicating operations by this communication control unit 6, and data such as images that have been acquired and processed in a camera unit 12 are sequentially and temporarily stored in a buffer unit 7.

While a control unit 8 has contained therein a CPU (Central Processing Unit) as hardware, the control unit 8 reads a program stored in a storage unit 10 so as to execute respective functions. This control unit 8 directly derives a command from the communication control unit 6, or derives the command temporarily stored in the buffer unit 7 and analyzes the derived command in some cases, and then, executes the program in accordance with the analyzed commands, and also, inputs/outputs setting information and the like with respect to the storage unit 10 in order to save the setting information.

A processing unit 9 executes data processing operation of voice data temporarily stored in the buffer unit 7, performs a control instruction in accordance with camera control information, and processes image information acquired from the camera unit 12, and then, sequentially stores the processed image information into the buffer unit 7. The storage unit 10 is constructed of a ROM, a RAM and a non-volatile memory. Programs stored in the ROM and the non-volatile memory, are read into the RAM so as to be segmentially processed.

It should also be understood that any of the above-described communication control unit 6, buffer unit 7, control unit 8, processing unit 9, and storage unit 10 must be provided in the network camera 2, and these units are not specifically provided units. However, in the embodiment mode 1 of the present invention, as a featured arrangement, a server monitoring unit 11 (sever monitoring daemon) has been mounted on the next camera 2, while the server monitoring unit 11 is communicated with the access control server 4. When a power supply is turned ON, the server monitoring unit 11 requests an establishment of a session with respect to the access control sever 4 in a periodic manner; when a control request command of the network camera 2 is issued from the terminal apparatus 3 during the connection, the server monitoring unit 11 passes this command to the control unit 8, and stores the setting information into the storage unit 10.

Subsequently, a description is made of detailed arrangements for executing the respective functions of the network camera 2. In the network camera 2, externally supplied light is acquired by a camera unit 12. A light receiving cell such as a CCD, a CMOS, or the like has been provided in the camera unit 12, while the light receiving cell photo-electrically converts light passed through a lens into an electric signal. Also, a control circuit has also be provided in the camera unit 12, and this control circuit controls an electronic shutter and exposure time so as to output R, G, B color signals, or complementary signals from the light receiving cell.

In an image processing unit 13, either the R, G, B color signals or the complementary signals outputted from this camera unit 12 are converted into a luminance signal "Y" and color difference signals "U" and "V" based upon these signals; a contour correcting process, a gamma correcting process, and the like are carried out with respect to the luminance signal "Y", and the color difference signals "U" and "V"; the processed signals are captured so as to be compressed based upon a JPEG format, a Motion JPEG format, or the like. These compressed image data are outputted to an image buffer unit 14 so as to be temporarily stored.

Also, as to voices (sounds), the network camera 2 captures voices arrived in a forward direction from the network camera 2 by a microphone 15, and then processes voice data received from the terminal apparatus 3 via the IP network 1 so as to output voices/sounds from a speaker 16. The voices inputted from the microphone 15 are coded by a voice processing unit 17, and the received voice data is decoded by the voice processing unit 17. A voice buffer unit 18 temporarily stores the voice data outputted form the voice processing unit 17 and the voice data received from the terminal apparatus 3.

On the other hand, as previously described, the network camera 2 transmits image data compressed based upon the JPEG system, Motion JPEG system, or the like as a payload. At the same, alternatively, the network camera 2 may store voice data processed based upon the ASF (Advanced Streaming Format) system within a header, and may transmit camera information (will also be referred to as "JPEG data") constituted by image+voice information, and then may transmit the camera information to the access control server 4, so that the network camera 2 may perform both the image communicating operation and the voice communicating operation. It should also be noted that as apparent from the foregoing description, these image data, voice data and JPEG data may be replaced by such data processed based upon MPEG-4, H.263+, H.264 systems. Alternatively, the access control server 4 may transmit and/or receive still images, still images and sounds, or moving pictures and sounds (video, apparently, quasi-moving pictures and sounds, only quasi-moving pictures, or only moving pictures may be alternatively transmitted). It should also be noted that in quasi-moving pictures, still images are continuously transmitted.

Next, a description is made of control operations as to one of the network cameras 2. A panning operation unit 19 performs a panning operation with respect to the network camera 2 so as to change an attitude of the network camera 2 along right and left directions upon receipt of a control instruction issued from the processing unit 9. Similarly, a tilting operation unit 20 performs a tilting operation with respect to the network camera 2 so as to change an azimuth angle direction thereof. Also, a zooming operation unit 21 performs a zooming operation of the network camera 2, and a focusing operation unit 22 performs a focusing operation so as to focus the network camera 2 to a predetermined focal distance. Furthermore, an external input/output unit 23 causes, for example, a person sensitive sensor to be connected to the network camera 2 in order to perform an external inputting/outputting operation.

Then, the camera control unit 24 corresponds to such a function realizing means capable of controlling the panning operation, the tilting operation, the zooming operation, and the focusing operation as to the network camera 2, and also controlling other inputting/outputting operations, which have been described above. It should also be noted that a camera control command buffer unit 25 provided in the buffer unit 7 temporarily stores a cameral control command transmitted from one of the terminal apparatuses 3 in order to execute these control operations and other inputting/outputting operations.

Subsequently, a description is made of an internal arrangement of the control unit 8 that controls the entire system of the network camera 2. A command analyzing unit 26 of the control unit 8 analyzes a command for controlling the network camera 2. Also, a setting information input/output unit 27 sets resolution of the network camera 2 and other setting information thereof. Then, a command executing unit 28 executes an analyzed command. For instance, the command analyzing unit 26 analyzes a GET method, and the like supplied from the terminal apparatus 3; if the analyzed command corresponds to a panning operation, then the command executing unit 28 instructs the camera control unit 24 to execute this panning operation; otherwise, if the analyzed command requires to acquire an image, then the command executing unit 28 instructs the image processing unit 13 to execute an image acquiring operation.

Also, a server monitoring unit 11 has been equipped with the below-mentioned arrangements. That is, while a server communication control unit 29 has been provided in the server monitoring unit 11, the server communication control unit 29 requires a session establishment, and when the connection is continued for a predetermined time and then is cut off, the server communication control unit 29 repeatedly performs the above-described process operations. Also, a command accepting/passing control unit 31 arranged by a CGI (Common Gateway Interface), and a command analyzing unit 30 for analyzing a command have been provided, and further, a setting information inputting/outputting unit 32 for inputting/outputting setting information has been provided.

As a consequence, when the server communication control unit 29 receives a control request command issued from the access control server 4, the command accepting/passing control unit 31 is initiated, so that the command accepting/passing control unit 31 passes this command to the command analyzing unit 30. If plural commands are received, then the command analyzing unit 30 divides these plural commands into respective commands.

As the internal arrangement of the network camera 2 has been described, an internal arrangement of a server apparatus according to the embodiment mode 1 of the present invention will be described with reference to FIG. 3.

Figure 3:
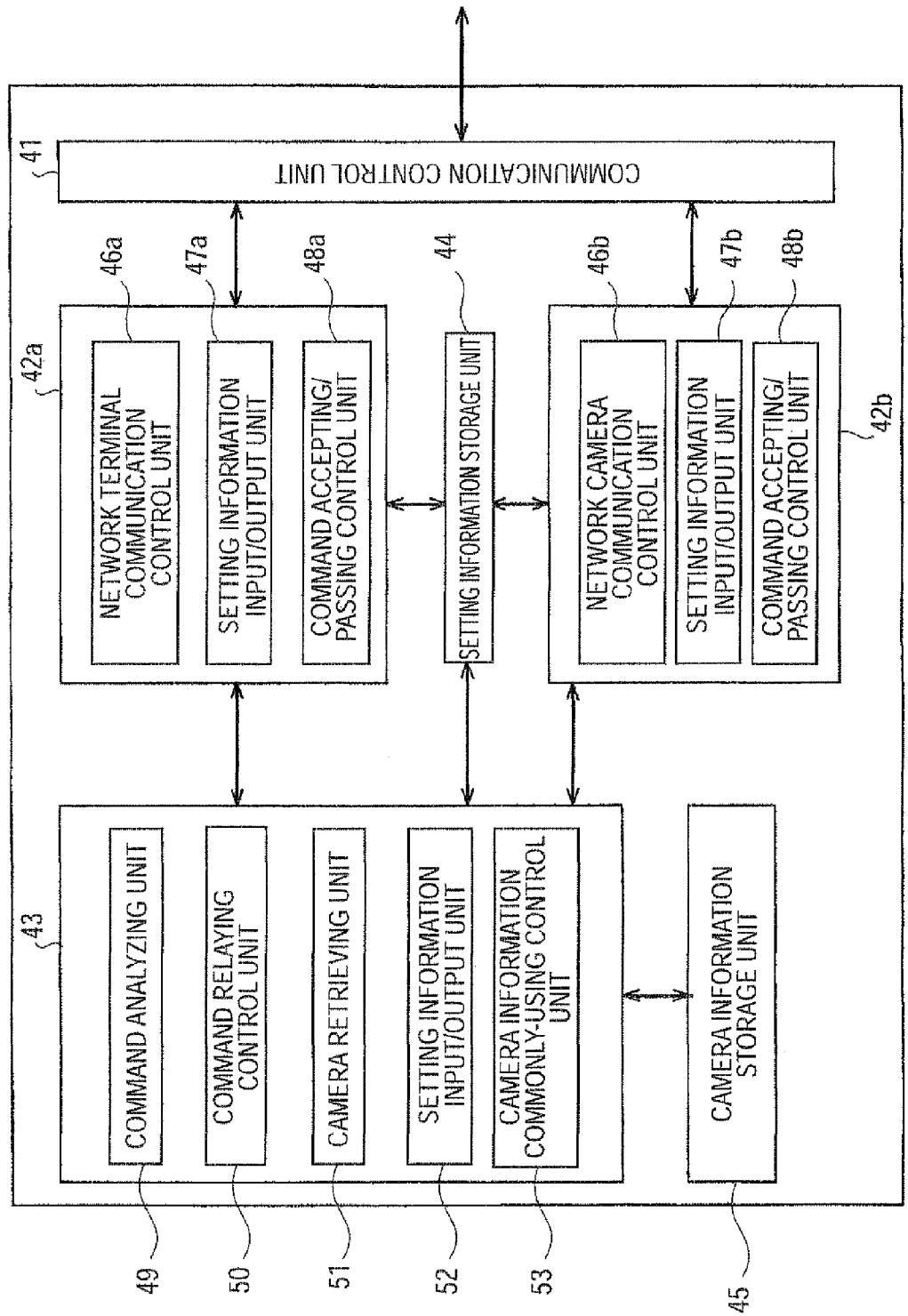
FIG. 3 is a block diagram for indicating the server apparatus according to the embodiment mode 1 of the present invention.

As indicated in FIG. 3, while a communication control unit 41 functioning as an interface has been provided in the access control server 4, the communication control unit 41 performs a communication operation with respect to the network camera 2 based upon such a protocol as the TCP/IP protocol, or the like. This communication control unit 41 is controlled by two sets of function realizing means.

The first function realizing means corresponds to a network terminal monitoring unit 42a (terminal monitoring daemon) that is communicated with the terminal apparatus 3 connected thereto via the Internet (IP network). The second function realizing means corresponds to a network camera monitoring unit 42b (camera monitoring daemon) that establishes a session with respect to the network camera 2 by using "Keep Alive" with connection confirmation time.

For example, when the network camera monitoring unit 42b receives a session establish request (http: GET/cgiXXX) from the server monitoring unit 11 of the network camera 2, the network camera monitoring unit 42b transmits a response signal (http/1.1 200 OK) so as to be connected with the network camera 2. Also, when the network terminal monitoring unit 42a receives a registration request (http: GET/cgiYYY) from the terminal apparatus 3, the network terminal monitoring unit 42a registers user information (user ID, password set by user etc.), and specific information (information obtained from QR code etc.) of the network camera 2 in a connection information database of a camera information storage unit 45.

The commands acquired by the network terminal monitoring unit 42a and the network camera monitoring unit 42b are analyzed by a sever control unit 43, and the analyzed commands are executed. In this case, the setting information storage unit 44 is a connection information database that stores the specific information of the respective network cameras 2 and the user information such as the passwords. Also, image data, voice data, positional information, and the like of the respective network cameras 2 are stored in the camera information storage unit 45 in order that when one set of the network camera 2 is accessed by the plurality of terminal apparatuses 3 at the same time, this single network camera 2 can respond by utilizing common data.

Also, in FIG. 3, a network terminal communication control unit 46a that is communicated with the terminal apparatus 3 has been provided in the network terminal monitoring unit 42a, and a network camera communication control unit 46b that is communicated with the network camera 2 has been provided in the network camera monitoring unit 42b. In the network terminal monitoring unit 42a and the network camera monitoring unit 42b, setting information inputting/outputting units 47a and 47b have been provided respectively, and store user information transmitted from the terminal apparatus 3 in a setting information storage unit 44. Otherwise, the setting information inputting/outputting units 47a and 47b derive both specific information and user information transmitted from the network camera 2, and then store the derived specific and user information into the setting information storage unit 44.

Moreover, a URL required to access a network camera 2 from a terminal apparatus 3, user information (namely, user ID and/or password) of this terminal apparatus 3, and specific information (namely, MAC address and/or serial number, or information containing these MAC address and serial number) of the network camera 2 are stored in the setting information storage 44 in correspondence with each other.

Also, the setting information inputting/outputting unit 47a of the network terminal monitoring unit 42a notifies the URL from the setting information storage unit 44 via the network terminal communication control unit 46a to the terminal apparatus 3, while the URL is required in order that the network camera 2 is accessed by the terminal apparatus 3. Then, while command accepting/passing control units 48a and 48b have been provided in the network terminal monitoring unit 42a and the network camera monitoring unit 42b as a CGI for operating the server control unit 43. When a request command is issued from the terminal apparatus 3, or the network camera 2, the command accepting/passing control units 48a and 48b cause the server control unit 43 to analyze this request command, and performs a subsequent process operation. Also, the setting information is stored into the setting information storage unit 44 by the setting information inputting/outputting units 47a and 47b.

In the present embodiment mode 1, different URLs are utilized, depending upon the registration request issued from the terminal apparatus 3 to the access control server 4, and the access control requested from the terminal apparatus 3 to the network camera 2. As a consequence, the access control server 4 can discriminate the registration request from the access control to the network camera 2 depending upon the sorts of URLs, so that this access control server 4 can readily judge whether or not both the user information of the terminal apparatus 3 and the specific information of the network camera 2 should be registered.

Also, since the terminal apparatus 3 is registered in the access control sever 4 by utilizing the URL, an instructure for the registration purpose is not separately required in addition to the access, and thus, the registering sequence can be simplified.

Now, a description is made of an arrangement of the server control unit 43 to which this information is accepted and/or passed. The command analyzing unit 49 judges contents of commands that are transmitted from the network camera 2 and the terminal apparatus 3. Since this command analyzing unit 49 analyzes the transmitted command, the access control server 4 is operated in response to the content of the analyzed command. A command relay control unit 50 of FIG. 3 has been provided in order to relay a packet between the network camera 2 and the terminal apparatus 3. At this time, the setting information of the setting information storage unit 44 is observed. Such an operation that the access control server 4 relays the packet implies that the access control server 4 produces a request packet having the same content and transmits the produced request packet, instead of the network camera 2 and the terminal apparatus 3.

When a packet of a terminal request is received from the terminal apparatus 3, a camera retrieving unit 51 retrieves whether or not a plurality of terminal apparatuses 3 have accessed one of these network cameras 2 at the same time. Then, in such a case that the plural terminal apparatuses 3 have accessed one of the plural network cameras 2 at the same time, a camera information commonly-using control unit 53 performs such a control operation for utilizing information which is commonly used when common distribution data may be used. For example, if one of these terminal apparatuses 3 accesses the network camera 2, then the setting information inputting/outputting unit 52 sets a flag of this access operation, and the camera retrieving unit 51 retrieves whether or not other terminal apparatuses 3 under connection are present; when distribution data commonly used between these terminal apparatus 3 is present, the camera information commonly-using control unit 53 transmits this commonly-used data to the terminal apparatus 3 as a payload.

Next, a description is made of operation flows as to the above-described access control server 4, network cameras 2, and terminal apparatuses 3.

When a registering process operation is newly carried out from a terminal apparatus 3 that requires a registration thereof and the access control server 4 accesses the notified predetermined URL, the CGI (command accepting/passing control unit 48a) is initiated in the access control server 4. As a result, the command analyzing unit 49 and the command relaying control unit 50 commence the process operations. In such a case that a terminal request corresponds to a request for acquiring camera information (JPEG data) of images and voices, or a request for operating the network camera 2, the command relaying control unit 50 transmits this terminal request to the network camera 2 with respect only to the network cameras 2 under continuation of the respective sessions. Also, when a response is returned to the terminal apparatus 3, the command relaying control unit 50 returns the response message to the terminal apparatus 3.

On the other hand, in such a case that a single network camera 2 is accessed from a plurality of terminal apparatuses 3 at the same time, there is such a risk that an overload condition may occur. As a consequence, in the embodiment mode 1, when a request of acquiring JPEG data is issued from the terminal apparatus 3, as previously described, the camera retrieving unit 51 of the access control sever 4 retrieves whether or not there is such a terminal apparatus 3 which has continuously established the session with the accessed network camera 2. When there is such a terminal apparatus 3 which has continuously established the session with the accessed network camera 2, the camera information commonly-using control unit 53 confirms whether or not the same JPEG data as the required JPEG data has been stored in the camera information storage unit 45. When the same JPEG data has been stored, the camera information commonly using control unit 53 derives this JPEG data, and transmits the derived JPEG data to such a terminal apparatus that has been accessed in a second time. In such a case that the same JPEG data as the above-explained JPEG data has not yet been stored, the terminal request is transmitted to the network camera 2 by being relayed by the access control server 4.

The network camera 2 that has received this terminal request transmits still image data acquired in a photographing operation by the camera unit 12, or transmits voice data collected by the microphone 15 as JPEG data to the access control server 4. When the terminal request causes the network camera 2 to be operated, the network camera 2 performs a panning control operation, a tilting control operation, and the like. Upon receipt of the JPEG data from the network camera 2, the access control server 4 stores the received JPEG data in the camera information storage unit 45, and produces such a packet that the JPEG data is employed as a payload, and then, transmits the produced packet to the terminal apparatus 3.

Due to the effects of this camera information commonly-using control unit 53, in the case that the JPEG data has already been stored in the camera information storage unit 45, the access control server 4 directly distributes the JPEG data stored in the camera information storage unit 45 to such terminal apparatuses 3 which have accessed as a second terminal apparatus 3 and succeeding terminal apparatus 3, while the access control server 4 does not access the network camera 2. As a result, the access control server 4 can acquire the images without unnecessarily accessing the network camera 2, so that the workloads given to the network camera 2 can be reduced.

Figure 4:
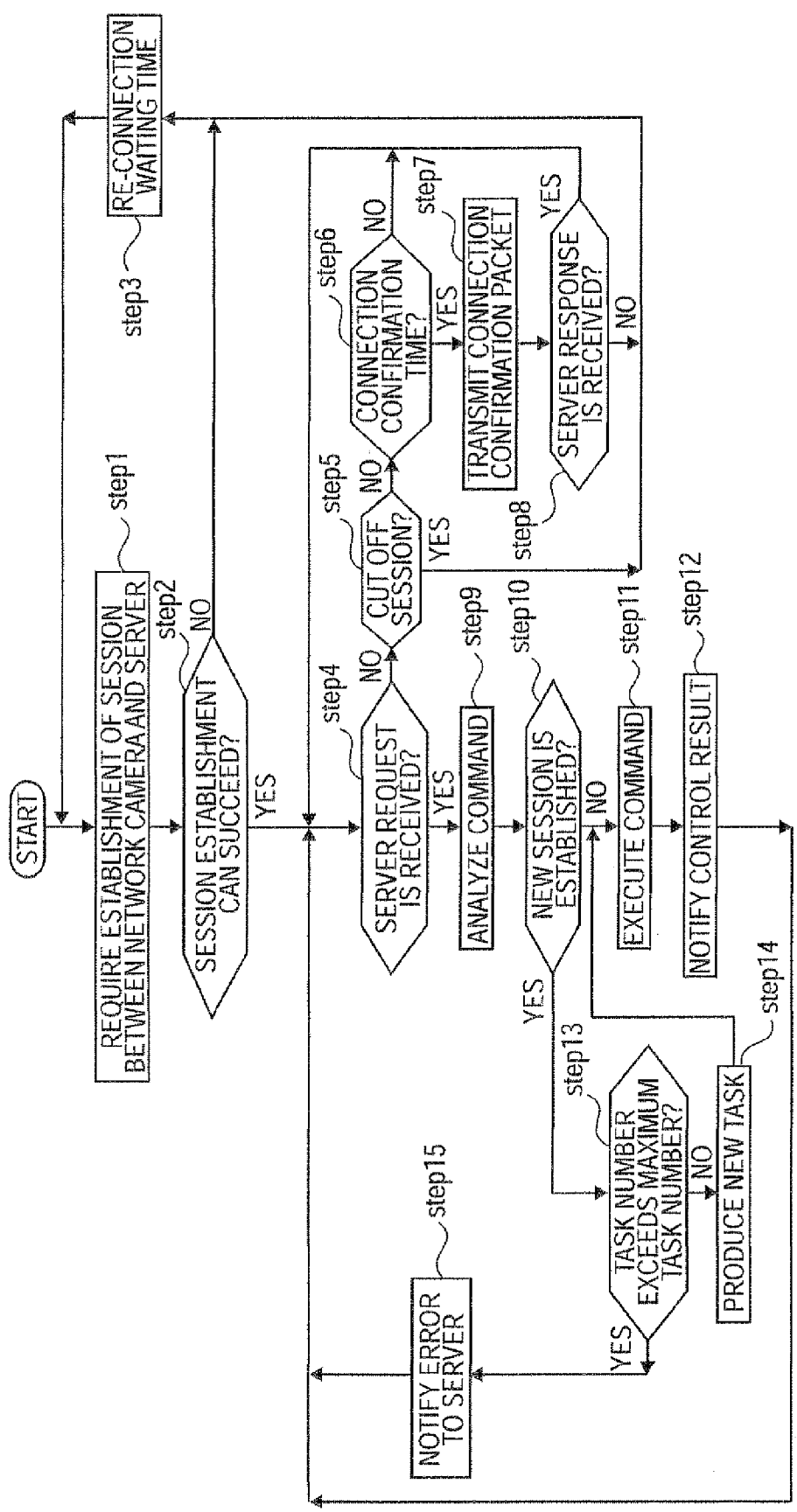
FIG. 4 is a flow chart for describing process operations of the network camera employed in the embodiment mode 1 of the present invention.

Accordingly, a description is made of operations as to one of the above-described network cameras 2 employed in the embodiment mode 1 based upon a flow chart shown in FIG. 4. Firstly, one of the plural network cameras 2 is connected to the router 5, and the power supply thereof is turned ON so as to try to establish a session with respect to the access control server 4 (step 1), and then, the network camera 5 accesses the access control server 4 until the session establishment (connection) can succeed (step 2). In the step 2, if the session establishment cannot succeed, then the network camera 2 is brought into a waiting status for a re-connection time (step 3). Thereafter, the process operation is returned to the step 1 in which the network camera 2 again tries to establish a session. When the session is established, this network camera 2 is brought into a status of "Keep Alive with connection confirmation time" until the session is cut off.

When the connection establishment can succeed in the step 2, the network camera 2 confirms whether or not a server request is issued from the access control server 4 (step 4). In such a case that the network camera 2 cannot receive the server request, the network camera 2 judges whether or not this reception condition is caused by that the session is cut off (step 5). When the session is cut off from the access control server 4, after a predetermined time (re-connection time) has elapsed, the process operation is advanced to the previous step 3 in order to automatically recover the session established with respect to the access control server 4. In this step 3, the network camera 2 is brought into a waiting status for the re-connection time, and thereafter, the process operation is returned to the step 1 in which the network camera 2 again tries to establish a session.

If the session is not cut off in the step 5, then the network camera 2 can judge that this session is brought into the cut off status due to a network failure, or the like. Accordingly, the network camera 2 confirms whether or not the connection confirmation time of "Keep Alive with confirmation time" has elapsed (step 6). If the connection confirmation time has not yet elapsed, then the process operation is returned to the step 4 in which the network camera 2 waits for receiving the server request. To the contrary, when the connection confirmation time has passed in the step 6, the network camera 2 transmits a connection confirmation packet (namely, "Keep Alive request") of "Keep Alive with connection confirmation time" (step 7), and judges whether or not a server response of "Keep Alive with confirmation time" where the next time has been set is issued from the access control server 4 (step 8). In such a case that the above-described server response is issued from the access control server 4, the process operation is returned to the previous step 4 in which the network camera 2 is brought into a waiting status until a new server request is received. To the contrary, when the above-described server response is not issued, the process operation is advanced to the step 3 in which the network camera 2 waits until the re-connection time has elapsed, and thereafter, the process operation is returned to the step 1 in which the network camera 2 again tries to establish a session.

In such a case that the server request is issued from the access control server 4 in the step 4, the network camera 2 analyzes a command contained in the server request (step 9). The network camera 2 judges whether or not this analyzed command is to require to establish a new session in addition to the present session (step 10). When the analyzed command corresponds to such a command (for example, request of JPEG data) other than the new session establishment, the network camera 2 executes this command (step 11). Then, the network camera 2 notifies a result of this control operation with respect to the access control sever 4 (step 12).

To the contrary, in such a case that the analyzed command corresponds to a command for establishing a new session in the step 10, the network camera 2 judges whether or not this task quantity is smaller than, or equal to a maximum task number, for instance, 5 pieces of task numbers (step 13). When this task quantity is smaller than, or equal to the maximum task number, the network camera 2 produces a new task, and the process operation is advanced to a step 11 in which the network camera 2 executes the command for establishing a new session, and notifies the establishment of the new session to the access control server 4. To the contrary, when the task quantity exceeds the maximum task number in the judgment made in the previous step 13, since the network camera 2 is brought into an overload condition, the network camera 2 transmits an error notification to the access control server 4 (step 15). Then, the process operation is again returned to the previous step 4 in which the network camera 2 is brought into a waiting status until a new server request is issued.

Figure 5:
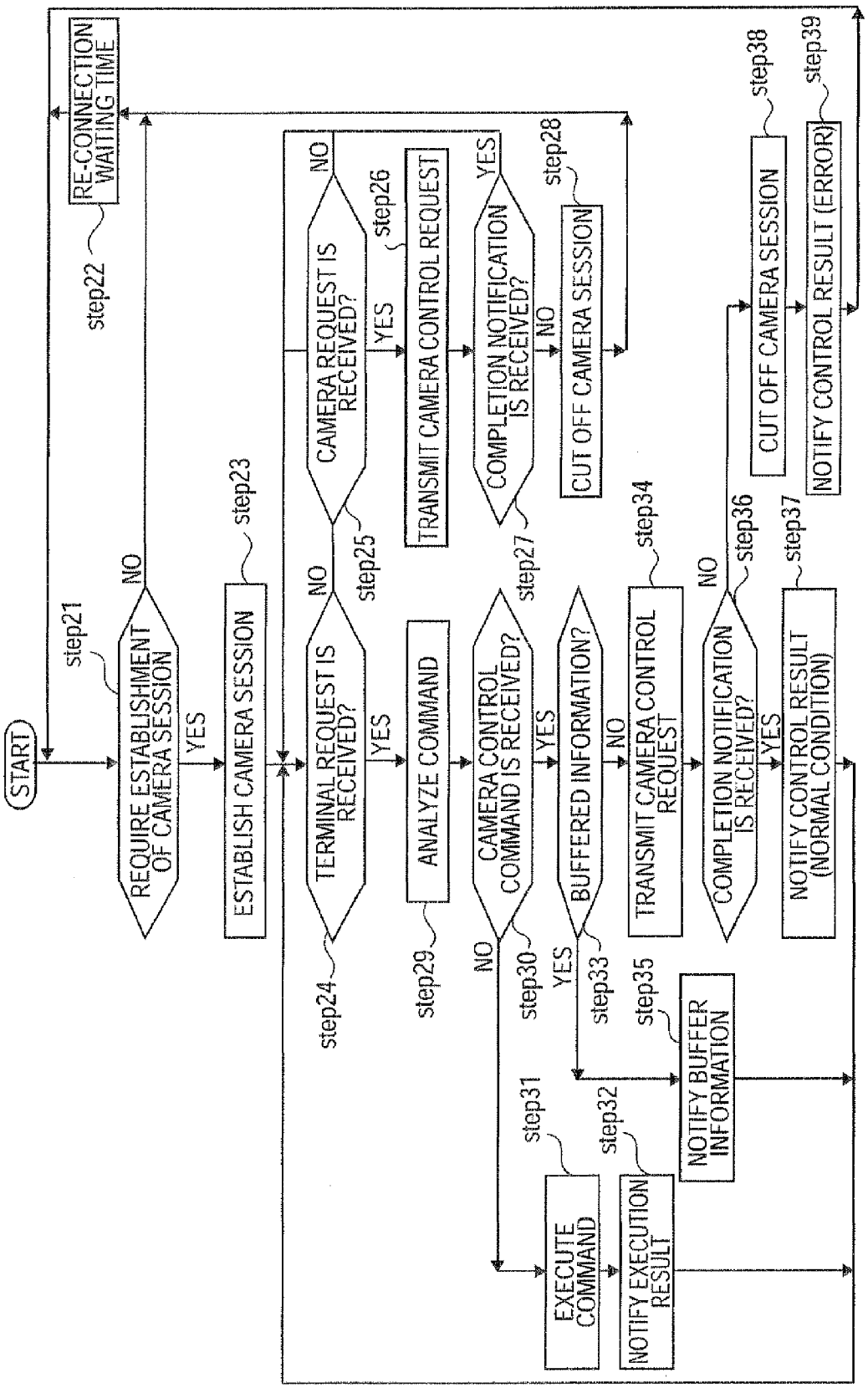
FIG. 5 is a flow chart for describing process operations of the server apparatus according to the embodiment mode 1 of the present invention.

Next, a description is made of operations as to the access control server 4 provided in the embodiment mode 1 with reference to a flow chart of FIG. 5. Firstly, the access control server 4 executes a registering process operation in accordance with a flow chart of FIG. 6 (will be discussed later). Then, the access control server 4 is brought into a waiting status until a camera session establishment request is issued from one of the network cameras 2 (step 21). If the camera session establishment request is not issued, then the access control server 4 waits until a re-connection time has elapsed (step 22). To the contrary, if the camera session establishment request is issued, then the access control server 4 establishes a camera session (step 23).

Next, the access control server 4 confirms whether or not a terminal request is received from one of the terminal apparatuses 3 (step 24). In such a case that the terminal request is not received from the relevant terminal apparatus 3, the access control server 4 judges whether or not a camera request from the network camera 2 is received, and also, a request of "Keep Alive with connection confirmation time" for maintaining a session during a predetermined time is received from the network camera 2 (step 25). If the camera request is not received, then the process operation is returned to the previous step 24 in which the access control server 4 waits until the terminal request is received. In the step 25, when the access control server 4 repeatedly receives the camera request of "Keep Alive with connection confirmation time" from the network camera 2, the access control server 4 transmits a response of the camera control of "Keep Alive with connection confirmation time" to which the next time has been set (step 26). In such a case that the access control server 4 has received a completion notification unless the connection confirmation time of "Keep Alive" has elapsed, the process operation is returned to the step 24 in which the access control server 4 receives the terminal request (step 27). In such a case that the connection confirmation time has elapsed until the access control server 4 has not yet received the completion notification, the session of the network camera 2 is cut off, and the process operation is advanced to the step 22 in which the access control server 4 waits until the re-connection time has elapsed, and then, the process operation is returned to the step 21.

Subsequently, in the step 24, when the terminal request is received, the access control server 4 analyzes a command contained in the terminal request (step 29). The access control server 4 judges whether or not the analyzed command corresponds to a camera control command (step 30), in such a case that the analyzed command corresponds to such a camera control command as a panning control operation, a tilting control operation, or the like in the relevant session, the access control server 4 execute this analyzed command (step 31), and then, transmits an execution result notification to the terminal apparatus 3 (step 32), while the execution result notification notifies such a situation that the analyzed command has been executed.

In such a case that the analyzed command is not the above-described camera control command, but is a request of acquiring image information, voice information, and the like, the access control server 4 judges whether or not this request information is equal to information (namely, buffered information) which has already been stored in the camera information storage unit 45 (step 33). If this request information has already been stored in the camera information storage unit 45, then this request information corresponds to such an information that can be commonly used by the plurality of terminal apparatuses 3. As a result, the buffered information that has been temporarily stored is transmitted from the access control server 4 to the terminal apparatus 3 (step 35), and then, the process operation is returned to the step 24.

In the step 33, when the buffered information is not present, the access control server 4 transmits a camera control request for requiring image information, voice information, and the like with respect to the network camera 2 (step 34), and then, judges whether or not a completion notification could be received from the network camera 2 (step 36), while the completion notification has stored thereinto the image data, the voice data, and the like. When the completion notification is received, the access control server 4 transmits a control result notification for transmitting this information to the terminal apparatus 3 (step 37). In this case, the above-described control result notification implies that the request of the terminal apparatus 3 has been accomplished under normal condition (step 28).

However, in the step 36, in such a case that the completion notification cannot be received from the network camera 2, this situation implies that a certain failure has occurred. As a result, the access control server 4 cuts off the session established with respect to the network camera 2, issues such a control result notification that the error has occurred, and then, the process operation thereof is returned to the previous step 21 in which the access control server 4 is brought into a waiting status.

Figure 6:
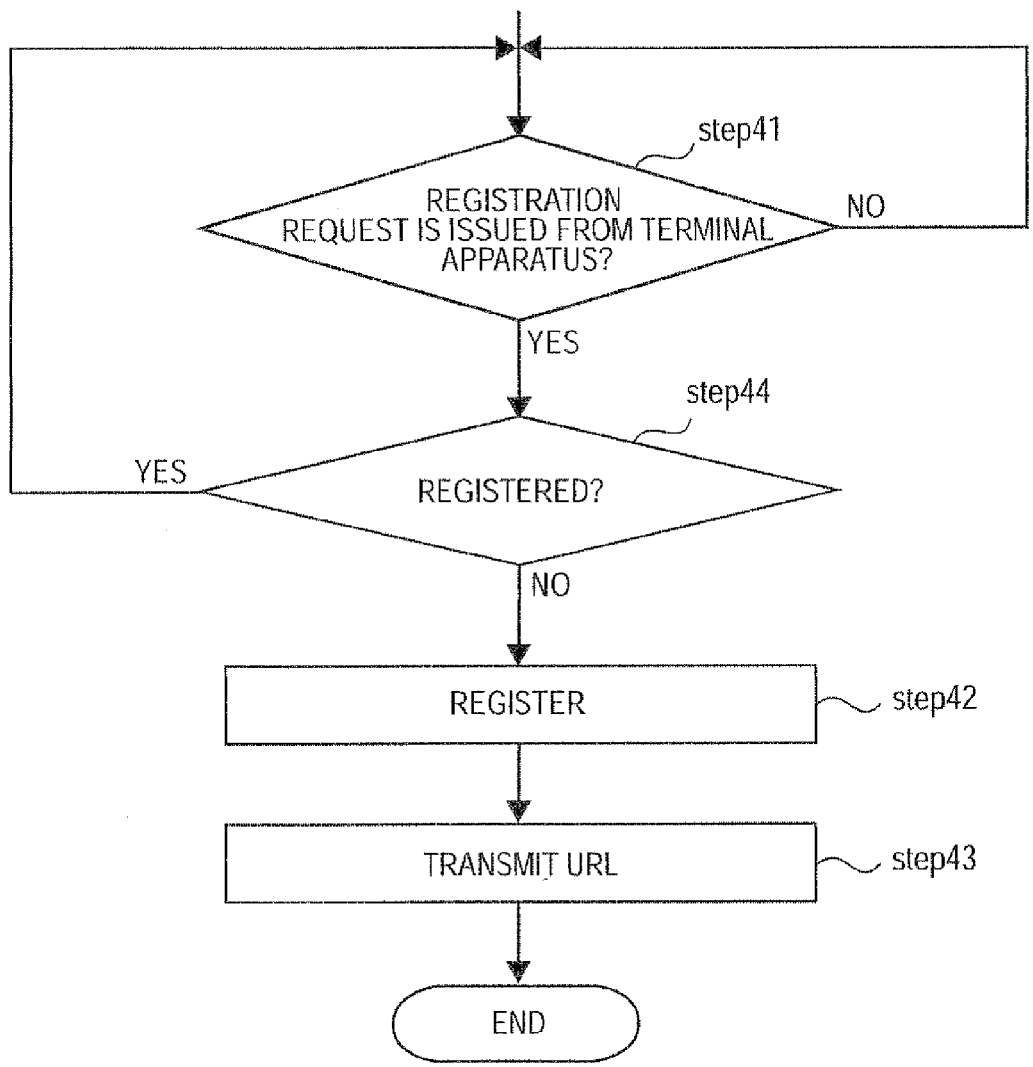
FIG. 6 is a flow chart for describing registering process operations executed by the server apparatus according to the embodiment mode 1 of the present invention.

Subsequently, a description is made of the above-described registering process operation. In FIG. 6, firstly, the access control server 4 judges whether or not a registration request is issued from the relevant terminal apparatus 3 (step 41).

While both the specific information of the network camera 2 and the user information (user ID, password etc.) have been added as camera setting information to the registration request, the access control server 4 judges whether or not the same camera setting information as the above-described camera setting information has been stored in the setting information storage unit 44 (step 44), and registers the first-mentioned camera setting information if the same camera setting information has not been registered (step 42). This camera setting information may be transmitted in such a manner that a Web page is transmitted, and then, information derived from the access control server 4 is acquired, or written in this Web page. In the Web page, a predetermined site of the access control server 4 is accessed from the terminal apparatus 3 so as to prompt inputting of the information from the access control server 4.

When the above-described registering process operation is accomplished, the access control server 4 transmits such an URL that the terminal apparatus 3 will subsequently access (step 43). As a consequence, if the terminal apparatus 3 tries to acquire images and voices from the network camera 2, since the terminal apparatus 3 accesses the transmitted URL, then the access control server 4 relays this request, so that the terminal apparatus 3 can be communicated with the network camera 2.

Figure 7:
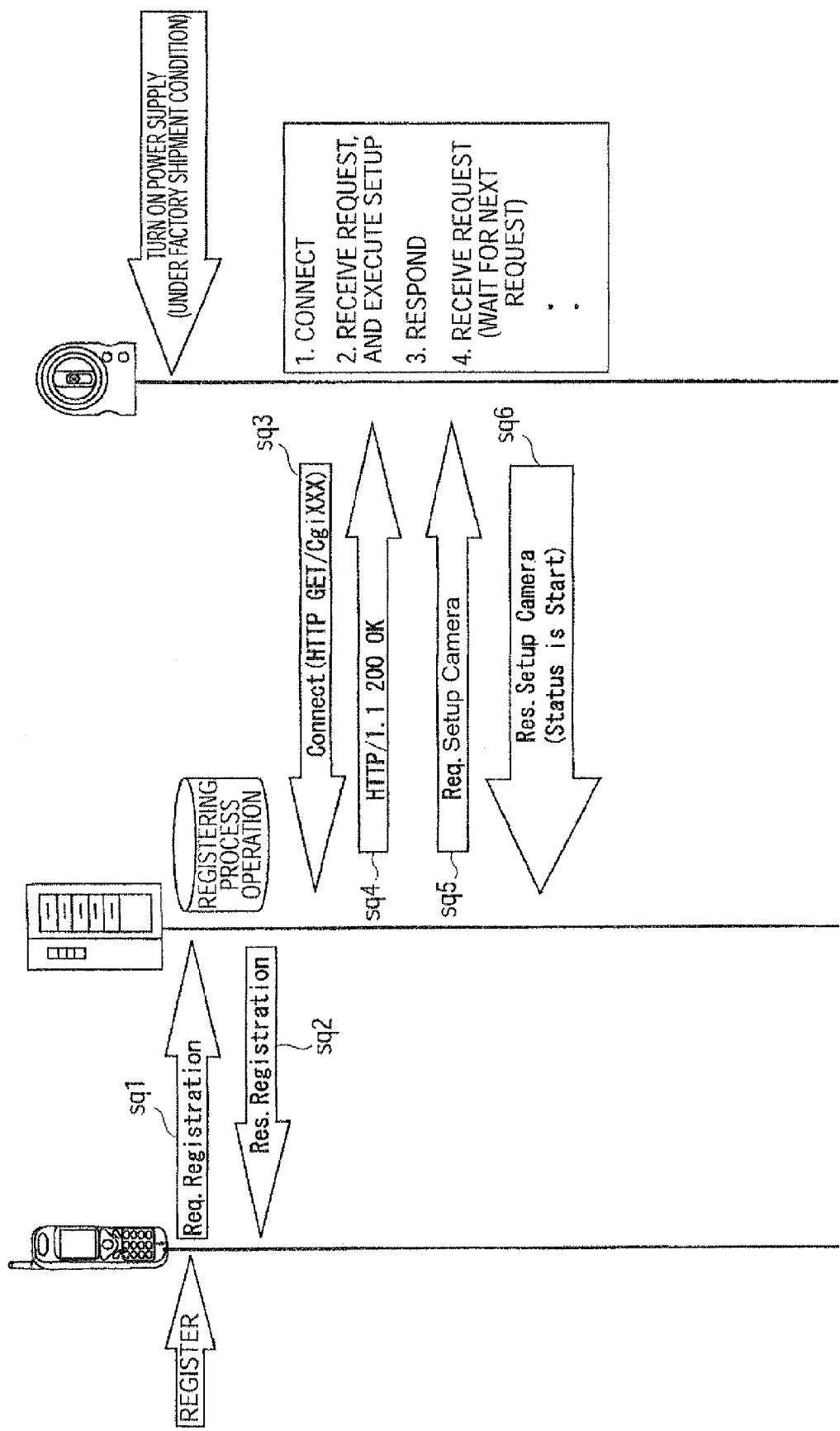
FIG. 7 is a sequential diagram for explaining registering process operation with respect to the server apparatus according to the embodiment mode 1 of the present invention.

While the arrangements and the operations of the network camera 2 and the access control server 4 have been described, a description will be made of sequential operations executed among three units, namely, the terminal apparatus 3, the network camera 2, and the access control server 4. FIG. 7 indicates a registration sequence of a network system that is communicated via the server apparatus according to the embodiment mode 1. In FIG. 7, firstly, the terminal apparatus 3 transmits setting information in combination with a registration request (sq1), while the setting information is constituted by user information and specific information such as a MAC address and a serial number (manufacturing number) of the network camera 2. In response thereto, the access control server 4 performs a registration processing operation, and then, notifies such a URL as a registration response, while this URL is utilized when the access control server 4 accesses the network camera (sq2).

Thereafter, when the power supply of the network camera 2 is turned ON, the server monitoring unit 11 (server monitoring daemon) of the network camera 2 transmits a connection request containing the specific information with respect to the access control server 4, since a status of the network camera 2 is a factory shipping status at this time (sq3). In response thereto, the access control server 4 transmits a response signal (200, OK) (sq4), and also requests to set up the network camera 2 (sq5). In other words, the access control server 4 identifies the specific information of the network camera 2 stored in the setting information storage unit 44 with the specific information transmitted from the network camera 2. When the first-mentioned specific information of the network camera 2 is coincident with the specific information transmitted from the network camera 2, the access control server 4 transmits the user information of the terminal apparatus 3 stored in the setting information storage unit 44. Upon receipt of this request, the network camera 2 executes a setup operation.

Then, the network camera 2 transmits a response of the step completion in response to the setup request to the access control server 4 (sq6), and then, waits for a server request. When the setup operation cannot succeed, this sequential operation is repeatedly carried out after the re-connection waiting time has elapsed.

Figure 8:
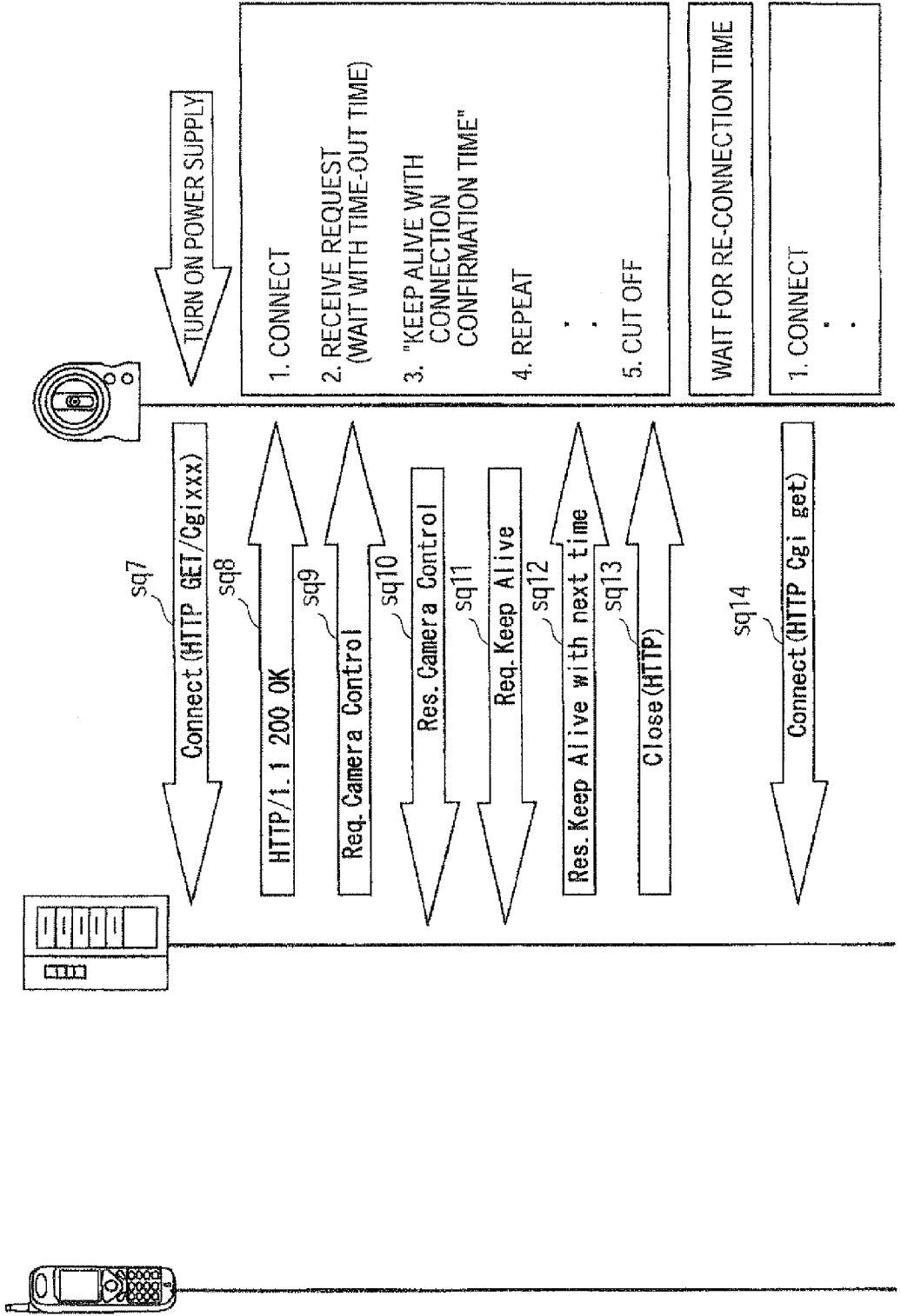
FIG. 8 is a sequential diagram for showing a session of the network camera and the sever apparatus according to the embodiment mode 1 of the present invention.

Next, a description is made of a basic sequential process operation executed between one of the network cameras 2 and the access control server 4 with reference to FIG. 8. When the power supply of the network camera 2 is turned ON, the server monitoring unit 11 (server monitoring daemon) of the network camera 2 notifies a connection request with respect to the access control server 4 (sq7). In response to the connection request, the access control server 4 transmits a response signal (200 OK) (sq8), and also, transmits a camera control request (namely, server request) (sq9). Upon receipt of this camera control request, the server monitoring unit 11 of the network camera 2 transmits such a response for indicating that the camera control request has been received (sq10), and transmits a request of "Keep Alive" if the server request does not require cutting off of a session (sq11). When the server request requires cutting off, the session is cut off.

In response to this request of "Keep Alive", the network camera monitoring unit 42b of the access control server 4 transmits a camera control response (namely, connection confirmation) of "Keep Alive with connection confirmation time" to which a next time of connection confirmation has been set (sq12). It should also be noted that while this next time has not yet elapsed, the network camera 2 waits until a cut-off request is issued and until a server request is issued (session is continued), and transmits a camera control response of "Keep Alive with connection confirmation time" when the next time has passed. Then, when the access control server 4 issues the cut-off request (sq13), the server communication control unit 29 of the network camera 2 cuts off the session.

Then, when the re-connection time has elapsed after the session was cut off, the server communication control unit 29 of the network camera 2 again notifies a connection request with respect to the access control server 4 (sq14). A similar notifying operation is carried out in such a case that there is no camera control response (connection confirmation packet) of "Keep Alive with connection confirmation time" in the sequence "sq12." Subsequently, sequential operations similar to those defined after the sequence "sq3" are repeatedly carried out every time the re-connection time has passed.

Figure 9:
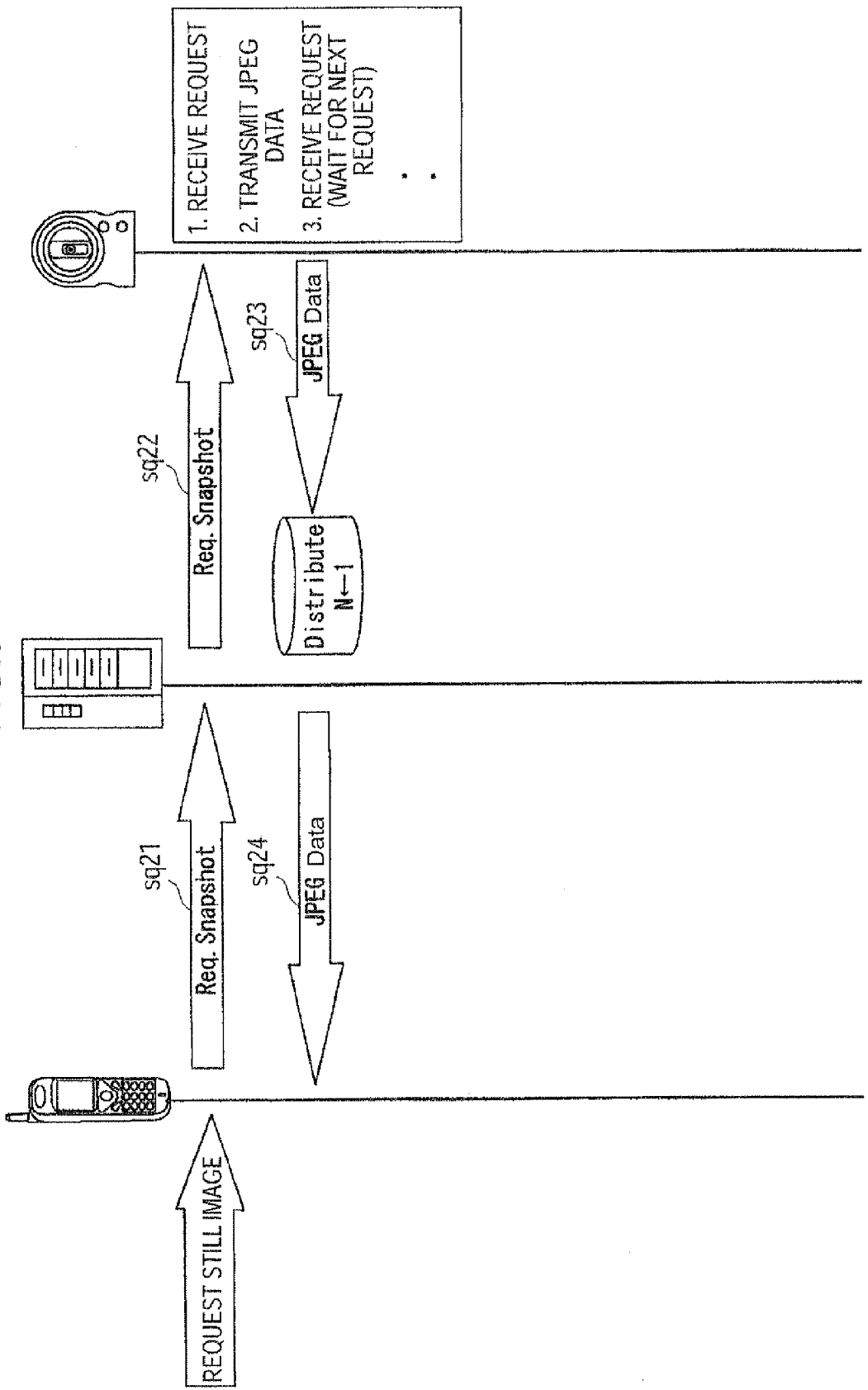
FIG. 9 is a sequential diagram for explaining process operations in which a terminal apparatus acquires a still picture from the network camera via the server apparatus of the embodiment mode 1 of the present invention.

Next, a description is made of sequential process operations for acquiring JPEG data such as a still image from one of the terminal apparatuses 3 with respect to one of the network cameras 2 with reference to FIG. 9. In order to require a still image, when the terminal apparatus 3 transmits a terminal request for requiring JPEG data to a predetermined URL (sq21), the access control server 4 relays this terminal request so as to transfer the relayed terminal request to one of the above-explained network cameras 2 (sq22).

It should be understood that such a sequential operation will be discussed later when the JPEG data has been required from other terminal apparatuses 3 than the above-explained one terminal apparatus 3 in the sequence "sq22." Upon receipt of this terminal request, the network camera 2 outputs an image photographed by the camera unit 12 to the image buffer 14 so as to temporarily store the outputted image, and then, transmits this temporarily stored buffered information, or such a buffered information which has already and temporarily stored with respect to the access control server 4 (sq23).

The access control server 4 temporarily stores the above-described JPEG data to the camera information storage unit 45 of the access control server 4, and further, the command relaying control unit 50 produces such a packet that the JPEG data of the still image is employed as a payload, and then, the produced packet is transmitted from the communication control unit 41 to the terminal apparatus (sq24). It should also be noted that not only the JPEG data of the still image, but also voice data may be transmitted in combination therewith.

Figure 10:
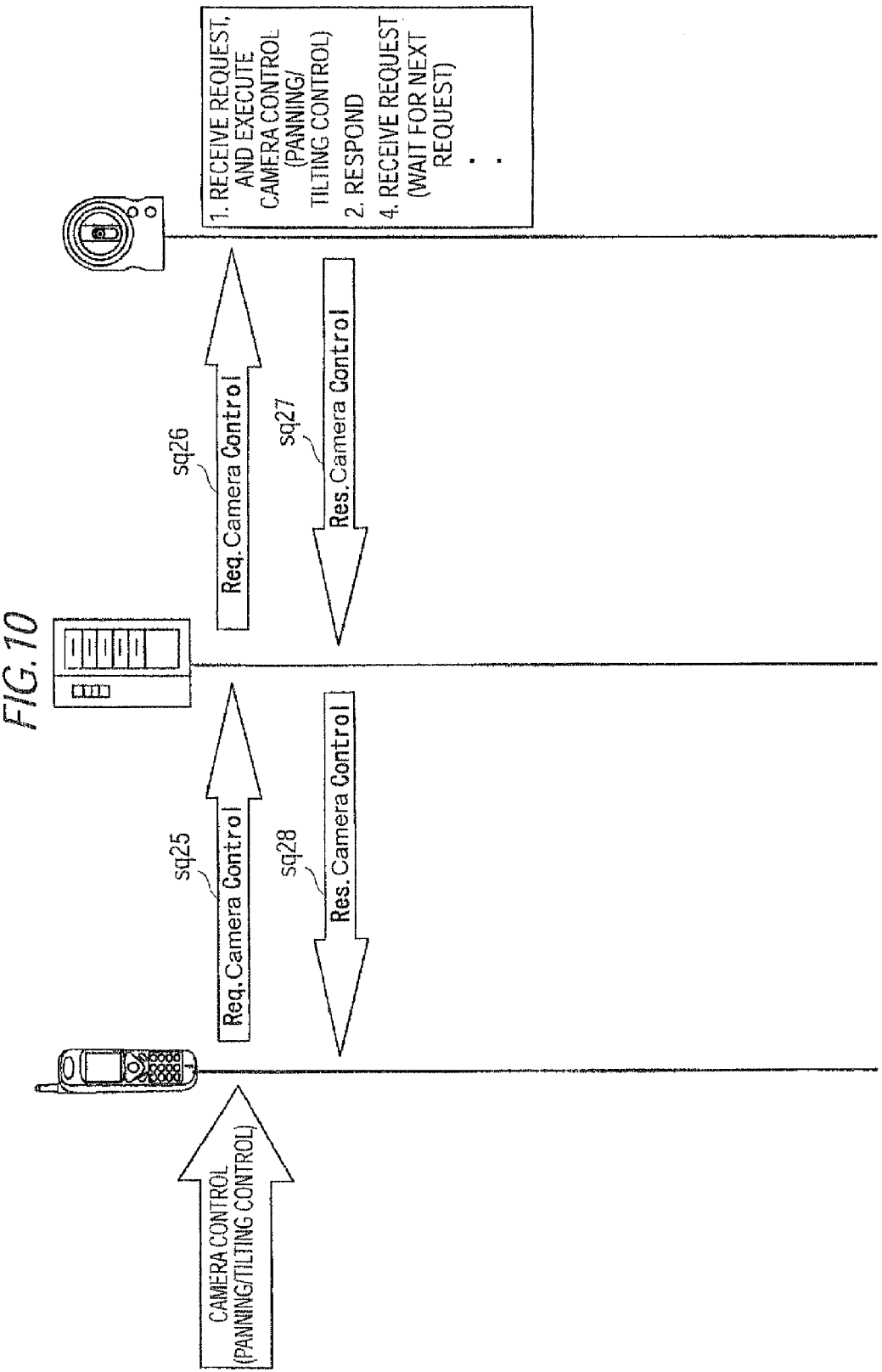
FIG. 10 is a sequential operation diagram for describing camera control operations of the network camera performed by the terminal apparatus via the server apparatus according to the embodiment mode 1 of the present invention.

Next, a description is made of sequential process operations when camera control operations such as a panning operation, a tilting operation, and the like as to one of the above-described network cameras 2 are carried out from one of the above-explained terminal apparatuses 3 with reference to FIG. 10. In order to operate this network camera 2, when a camera control request is transmitted from this terminal apparatus 4 with respect to a predetermined URL (sq25), the access control sever 4 transmits this camera control request to the network camera 2 (sq26). It should be noted that in the above-described sequence "sq26", the command analyzing unit 49 analyzes that the transmitted request corresponds to the camera control request, and the command relaying control unit 50 relays this analyzed camera control request.

When the network camera 2 receives the transmitted camera control request, the command analyzing unit 25 analyzes a control content thereof, and the command executing unit 28 executes the command so as to instruct the camera control unit 24 to perform such a control operation as the panning operation, the tilting operation, or the like. When the camera control unit 24 performs the control operation, the network camera 2 sends a control result notification with respect to the camera control request to the access control server 4 (sq27). Since the command relaying control unit 50 of the access control server 4 relays the control result notification, the access control server 4 may transmit this control result notification to the terminal apparatus 3 (sq28).

Figure 11:
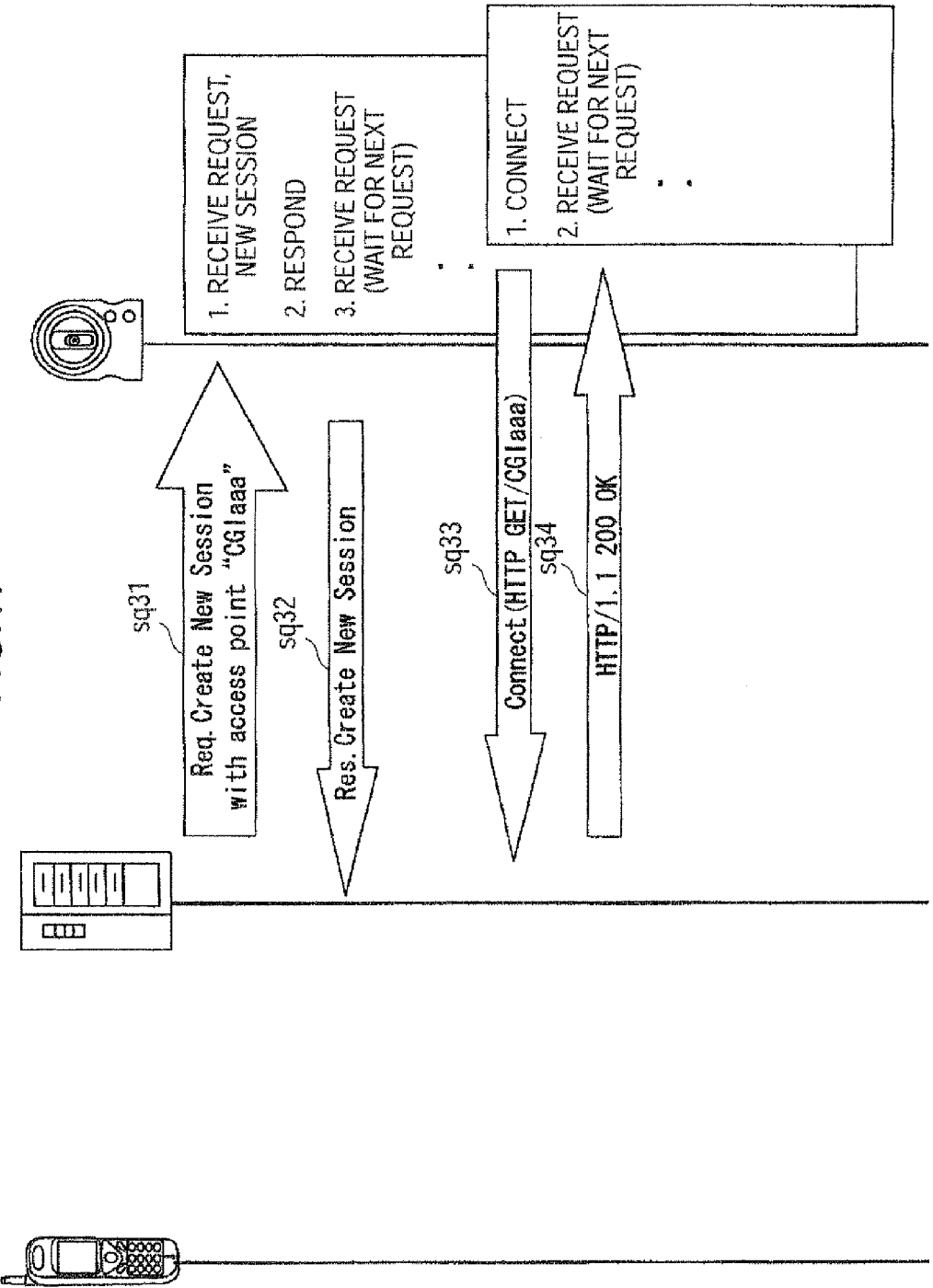
FIG. 11 is a sequential operation diagram for explaining forming of a new session between the network camera and the server apparatus according to the embodiment mode 1 of the present invention.

On the other hand, when the access control server 4 of the embodiment mode 1 receives the camera control request, the access control server 4 can establish a control-purpose new session between the own access control server 4 and the network camera 2 within the existing session. That is to say, as shown in FIG. 11, the access control server 4 issues a new session establishment request as a server request by using, for example, a URL (cgiaaa) (sq31).

When the network camera 2 receives this server request, the network camera 2 transmits a response capable of agreeing to this received server request in order to establish a new session (sq32); the command analyzing unit 26 analyzes a control content of the server request; the command executing unit 28 executes the analyzed command; and then; the server communication control unit 29 transmits a connection request (http: GET/cgiaaa) with respect to the access control server 4 (sq33). In response to the connection request, the access control server 4 transmits a response signal (200 OK) (sq34), so that a new session is established. Thus, by utilizing this established new session, the camera control request can be transmitted.

It should also be understood that when a new session is established, in such a case that a task number exceeds the maximum task number (for instance, 5 pieces of tasks) that has been set as the setting information, the new session cannot be established. The command analyzing unit 26 of the network camera 2 performs such a task establishment judgment; if the task number is smaller than, or equal to the maximum task number, then the command executing unit 28 transmits the connection request (http: GET/cgiaaa) of the sequence "sq33"; and if the task number exceeds the maximum task number, then the command executing unit 28 transmits an error notification to the access control server 4.

As a consequence, for example, while sessions of two routes are established between the terminal apparatus 3 and the network camera 2, such a process operation for requiring a time longer than, or equal to a predetermined time (for example, transmission of JPEG data having large capacity) may be required from the terminal apparatus 3 via one route, and also, the network camera 2 may be operated via the other route. In addition, one set of the above-described network cameras 2 may be accessed by two sets, or more sets of the above-explained terminal apparatuses 3, and may be separately controlled so as to acquire different JEPG data from this one network camera 2.

Subsequently, a description is made of process operations executed in such a case that one set of the network cameras 2 is accessed by the plurality of terminal apparatuses 3 so as to require a stream distribution of moving picture information (will be referred to as "video information" hereinafter) which contains voices. In this case, one terminal apparatus 3(A) and another terminal apparatus 3(B) access the access control server 4 one after another in order to require video information as to one set of the network camera 2.

Firstly, in order to require a stream distribution of the video information with respect to the network camera 2, when the terminal apparatus 3(A) transmits a terminal request for requiring a video distribution with respect to a predetermined URL (sq41), and the terminal apparatus 3(B) transmits a terminal request for requiring a video distribution with respect to another predetermined URL (sq42) one after another, the camera information commonly-using control unit 53 of the access control server 4 judges that these access operations correspond to the requests of the video distributions with respect to the commonly-used network camera 2, and thus, transmits a video distribution as a single server request to the network camera 2 (sq43).

When this single network camera 2 receives the video distribution request from the access control server 4, the command analyzing unit 26 judges that this received request corresponds to the video distribution request, and then, the command executing unit 28 produces such a packet that Motion JPEG (+ASF) data, MPEG data, and the like are employed as a payload based upon data stored in the image buffer unit 14 and the voice buffer unit 18 so as to transmit the produced packet to the access control server 4 (sq44).

The access control server 4 temporarily stores this video distribution data into the camera information storage unit 45; the command relaying control unit 50 produces such a packet that this video distribution data is employed as a payload so as to transmit the produced packet from the communication control unit 41 to the terminal apparatus 3(A) (sq45), and the command relaying control unit 50 produces such a packet that the same video distribution data is employed as a payload so as to transmit the produced packet from the communication control unit 41 to the terminal apparatus 3(B) (sq46). Thereafter, stream distributions are carried out from the network camera 2 via the access control server 4 to the terminal apparatus 3(A) and the terminal apparatus 3(B).

Thereafter, at a certain time instant, a cut-off request is transmitted from one of these terminal apparatuses 3(A) and 3(B) to the network camera 2. In other words, at certain timing, the network camera 2 transmits a packet of next distribution data to the access control server 4 (sq47), the access control server 4 temporarily stores this distribution data into the camera information storage unit 45, and transmits the distribution data to one terminal apparatus 3(A) (sq48).

However, when a cut-off request is issued from the other terminal apparatus 3(B) (sq49), at this timing, the command relaying control unit 50 of the access control server 4 stops the video distribution to this terminal apparatus 3(B) based upon the judgment result of the command analyzing unit 49.

Since a cut-off request has not yet been issued from the other terminal apparatus 3(A) at this time instant, the video distribution is continuously carried out from the network camera 2 to the access control server 2, and the command executing unit 28 continuously transmits the distribution data to the access control server 4 (sq50). This distribution data is transmitted to the terminal apparatus 3(A) by the access control server 4 (sq51).

Furthermore, thereafter, in order also to distribute the video distribution data to the terminal apparatus 3(A), the network camera 2 continuously transmits a packet of next video distribution data to the access control server 4 (sq52), and then, the access control server 4 transmits this next video distribution data to the terminal apparatus 3(A) (sq53). Then, when a cut-off request is issued from the terminal apparatus 3(A) at certain timing (sq54), the command analyzing unit 49 of the access control server 4 judges that this request corresponds to the cut-off request, and thus, the command relaying control unit 50 issues a cut-off request with respect to the network camera 2 (sq55).

As previously described, in accordance with the access control server of the embodiment mode 1, the user information derived from the terminal apparatus and the specific information of the network camera are registered; the connection information used to access the network camera is transmitted; and the specific information derived from the network camera is received so as to establish the session. As a result, while the access control server need not perform such a cumbersome work for setting the port forward to the router, the access control server can extremely simplify the access operation from the terminal apparatus to the network camera. Also, in such a case that the user information of the terminal apparatus and the specific information of the network camera have been stored, since the access control server can judge that the same information has already been registered, it is possible to avoid unnecessary duplicated registration of the same information.

While the images photographed by the network cameras have been stored in the camera information storage unit of the access control server, even when the image request for acquiring the image photographed by the network camera is issued from the terminal apparatus, since the access control server transmits the image stored in the camera information storage unit to the terminal apparatus without accessing the network camera, the terminal apparatus can acquire the image photographed by the network. As a result, a total time when the network camera is accessed from the terminal apparatus can be reduced, so that the accessing workloads of the network camera can be reduced.

In such a case that a processing operation for requiring a predetermined time is required from the terminal apparatus with respect to the network camera, since the control-purpose session for communicating the control command is established which is different from the communication-purpose session for communicating the image with respect to the network camera, even when such a session under use is occupied by the above-explained processing operation for requiring the predetermined time, an instruction with employment of the control command can be performed via the separately provided session. As a result, it is possible to avoid such an event that other processing operations cannot be carried out by executing above-described processing operation for requiring the predetermined time.

For instance, even when a moving picture is being acquired via the session under use, since an instruction for panning/tilting control operations can be transmitted via the separately provided session with respect to the relevant network camera, it is possible to avoid such an event that while the moving picture is acquired, the panning/tilting control operations cannot be carried out, but only such a screen along the same direction can be merely acquired.

Embodiment Mode 2

A description is made of a distributed server system and a server apparatus according to an embodiment mode 2 of the present invention. In the distributed server system employed in the embodiment mode 2, functions are shared by a server apparatus which performs a registering process operation related to a condition for checking whether or not a connection is allowed, and another server apparatus which performs an access control operation when a first terminal apparatus accesses a second terminal apparatus; and the registering process operation and the access control operation by the two server apparatuses are carried out in conjunction with each other.

The distributed server system according to the embodiment mode 2 is featured by that the functions of the server apparatus according to the embodiment mode 1 are separated so as to distribute loads. Since the arrangement of the embodiment mode 1 basically and equally corresponds to that of the embodiment mode 2, the same reference numerals shown in the embodiment mode 1 will be employed as those for denoting the commonly-used structures in the embodiment mode 2, and detailed descriptions thereof will be omitted. Also, the description of the embodiment modes is made with reference also to FIG. 1 to FIG. 12.

Figure 13:
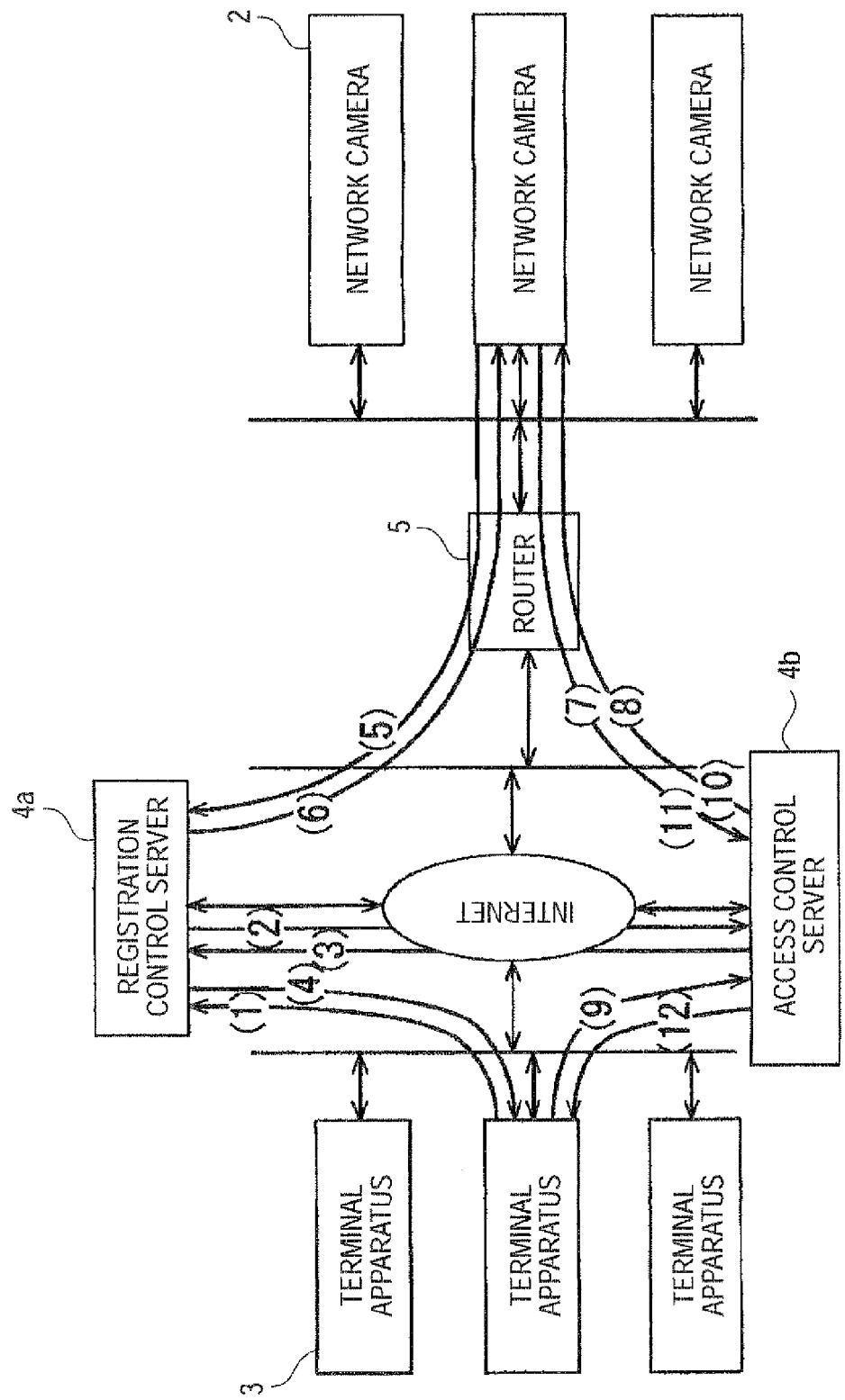
FIG. 13 is a structural diagram of a network system in which a communication operation is carried out via a server apparatus according to an embodiment mode 2 of the present invention.

In FIG. 13, an IP network 1 corresponds to such a network as the Internet where a communicating operation is performed based upon protocols of TCP/IP, and an intranet. A terminal apparatus 3 such as a portable telephone is connected to the IP network 1, and also, a router 5 is connected to the IP network 1. A plurality of network cameras 2 are connected to the downstream side of this router 5 and are operated under management of the router 5. The network cameras 2 record images photographed by camera units, and then, transmit the recorded images to the IP network 1. Then, the router 5 has contained a global IP address, and the respective network cameras 2 have contained external port numbers.

Also, to the IP network 1 of FIG. 13, a registration control server 4a and an access control server 4b are connected. The registration control server 4a is capable of accessing the network cameras 2 from the terminal apparatuses 3, and executes a registering process operation related to the terminal apparatuses 3. The access control server 4b performs an access control operation with respect to the terminal apparatus 3. It should be understood that an internal arrangement of the registration control server 4a and an internal arrangement of the access control server 4b are basically and commonly equal to the internal arrangement of the access control server 4 shown in FIG. 3.

A process operation of this distributed server system will now be explained based upon arrows shown in FIG. 13. When user information and specific information capable of discriminating individual network cameras are notified from the terminal apparatus 3 are notified to the registration control server 4a so as to issue a registration request as indicated as (1), in such a case that the user information of the terminal apparatus 3 and the specific information of the network camera 2 have not yet been stored, the registration control server 4a registers the user information and specific information in a connection information database of the setting information storage unit 44.

Subsequently, while the registration control server 4a uses access control server connection information so as to transmit the user information and the specific information stored in the setting information storage unit 44 with respect to the access control server 4b via a route indicated as (2), the access control server 4b stores these transmitted user information and specific information in the setting information storage unit 44 thereof. After the above-described process operation is carried out, the access control server 4b transmits connection information such as a URL which is employed in order to access the network camera 2 with respect to the registration control server 4b via a route shown as (3) (namely, camera connection information notification), and the registration control server 4a transmits the transmitted connection information to the terminal apparatus 3 via a route indicated as (4) (namely, camera connection information notification).

Basically speaking, the registration control server 4a executes only the registering process operation, and the access control server 4b executes the access control operation. This access control server 4b is employed in order to avoid such an overload condition that when only one server apparatus is employed, executions of both a registering process operation and an access control operation are concentrated to this single server apparatus. As a consequence, this access control server 4b merely performs the access process operation, and "N" sets of the access control servers 4b are connected to the IP network 1. Symbol "N" indicates 1, or more than 2.

With employment of the above-described arrangement, since process operations required from the terminal apparatus 3 may be shared by "N" sets of the above-described access control servers 4b (namely, 1/N loaded), the workloads given to only one server apparatus (as explained in embodiment mode 1) may be reduced. It should also be understood that although the registration control server 4a may merely perform the registering control operation, this registration control server 4a may execute a portion of the access control operation as one of the access control servers 4b in addition to the registering control operation as long as the overload is not given.

Subsequently, referring to FIG. 13, a description is made of operations when either a network camera 2 has not yet set up or has already been set up is connected. As indicated as (5), when the network camera 2 issues a connection request to the registration control server 4a, in the distributed server system of the embodiment mode 2, the registration control server 4a transmits a server switching notification in combination with the URL of the access control server 4b as indicated as (6) (namely, notification of access connection information). The network camera 2 cuts off a session, and again issues a connection request to the access control server 4b as indicated as (7). In such a case that the network camera 2 has not yet been registered, this network camera 2 notifies such a status that the own network camera 2 has not yet been set up, namely, a status indicative of factory shipment condition, and also, notifies the above-described specific information constructed by containing the MAC address and the serial number. In the case that the relevant network camera 2 has already been set up, this network camera 2 notifies the present status (status indicative of setup condition) in combination with the specific information.

In contrast to the above-described operation, the access control server 4b retrieves the content of the connection information database of the setting information storage unit 44 by using the transmitted specific information, and then, notifies a response signal (200 OK) to the network camera 2 if this specific information has been registered. Then, as indicated as (8), furthermore, the access control server 4b transmits this camera setting information (user information and specific information of terminal apparatus 3) to the specific network camera 2 so as to instruct a setup operation.

After the setup operation, a session establishment (connection) request is transmitted from the network camera 2 to the access control server 4b in a periodic manner by using the access server connection information. In contrast thereto, the access control server 4b transmits the response signal (200 OK) to the network camera 2 so as to bring the network camera 2 into a connection status. This connection is maintained for a predetermined time by utilizing "Keep Alive with connection confirmation time." When this connection confirmation time has elapsed, this sequential operation is repeatedly carried out.

Under such a condition that this session has been established, when the terminal apparatus 3 requests an image by using the URL corresponding to the connection information as shown as (9) in FIG. 13, the access control server 4b relays and transfers the image request as indicated as (10). In response thereto, the image is distributed from the network camera 2 as indicated as (11), and the access control server 4b transmits the image to the terminal apparatus 3 as represented as (12).

It should also be noted that similar to the embodiment mode 1, the access control sever 4b of the embodiment mode 2 can establish a communication-purpose secession of a first line between the network camera 2 and the own access control server 4, and in addition, can establish a second session of a second line, or more lines. When the access control server 4b transmits, for example, a camera control request of panning operation to the network camera 2 by way of the second session, the access control sever 4b transmits the camera control request to the network camera 2 by using this second session. After the network camera 2 has been controlled, this network camera 2 transmits a camera control completion notification to the access control server 4b, and then, the access control server 4b transmits the camera control completion notification to the terminal apparatus 3. As a result, the terminal apparatus 3 of the embodiment mode 2 can acquire the images from the network camera 2, and at the same time, can control the network camera 2 via a separate line.

A description is made of an internal arrangement of any one of the network cameras 2 of the embodiment mode 2. Basically, the internal arrangement of the network camera 2 according to the embodiment mode 2 is not different from that of the embodiment mode 1. As a consequence, a detailed description of this internal arrangement has been made in the previous embodiment mode 1. Referring now to FIG. 2, functions that have been added since the registration control server 4a has been separated from the access control server 4b will be mainly described.

In FIG. 2, a camera control command buffer unit 25 provided in the buffer unit 7 temporarily stores thereinto commands transmitted from the terminal apparatuses 3 in addition to a command for instructing a server switching operation, which is transmitted from the registration control server 4a.

The access server connection information (URL) has been contained in the server switching command transmitted from the registration control server 4a. When this command is received from the registration control server 4a, the command accepting/passing control unit 31 of the network camera 2 is initiated, and the received command is passed to the command analyzing unit 30. The command analyzing unit 30 analyzes such an instruction that the servers are switched, and also, extracts the URL, and then, the setting information input/output unit 27 stores the extract URL in the storage unit 10. Then, the command executing unit 28 transmits a cut-off request to the registration control server 4a so as to cut off the session established with respect to the registration control server 4a, and issues a session establishment request to the access control server 4b by utilizing the URL of the access server connection information.

In contrast thereto, the access control server 4b transmits the response signal (200 OK) to the network camera 2 so as to bring the network camera 2 into a connection status. A command for setup and the camera setting information such as the user information are transmitted from the access control server 4b. When the network camera 2 is setup in response to this camera control command, a session is established for a predetermined time between the network camera 2 and the access control server 4b by using "Keep Alive with connection confirmation time." When this connection confirmation time has elapsed, this sequential operation is repeatedly carried out. While the network camera 2 is under connection status, if an image transmission is required from the terminal apparatus 3 from the terminal apparatus 3, then the image is transmitted from the network camera 2 via the access control server 4b.

On the other hand, the registration control server 4a of the embodiment mode 2 monitors server load conditions with respect to plural sets of the above-described access control servers 4b connected to the IP network 1. In the embodiment mode 2, the load conditions are judged based upon ratios of (processed amounts/processing capabilities) with respect to the plural sets of access control servers 4b; the load conditions of all access control servers 4b are saved in a table as a list; and then, this table is stored in the setting information storage unit 44 in order that the access control servers 4b refer to this table during registering process operation. The higher the ratio (=load) is increased, the heavier the load becomes. The registration control server 4a selects proper access control servers 4b in such a manner that the ratios thereof can become equal to each other as being permitted as possible, and notifies the selected access control servers 4b as access control server connection information (URL). Such an access control server 4b having a lower ratio is selected. Since the control operation is carried out based upon the ratios of the processed amounts to the processing capabilities, the load condition can be simply monitored, and the server management can be executed in response to traffics of the IP network 1.

As the internal arrangement of the network camera 2 has been described, internal arrangements of the registration control server 4a and the access control server 4b according to the embodiment mode 2 of the present invention with reference to FIG. 3. Since the internal arrangement of the access control server 4b is basically common to the internal arrangement of the access control server 4 of the embodiment mode 1, detailed descriptions thereof have been made in the embodiment mode 1, and thus, only such an explanation will be made why the functions have been separated into the function of the registration control server 4a and the function of the access control server 4b.

As indicated in FIG. 3, while a communication control unit 41 functioning as an interface has been provided in the access control server 4b and the registration control server 4a, the communication control unit 41 performs a communication operation with respect to the network camera 2 based upon such a protocol as the TCP/IP protocol, or the like. This communication control unit 41 has been provided with a network terminal monitoring unit 42a that is communicated with the terminal apparatus 3 and a network camera monitoring unit 42b that establishes a session with respect to the network camera 2 by using "Keep Alive with connection confirmation time."

For instance, when the network camera monitoring unit 42b provided in the registration control server 4a and the access control server 4b receives a session establish request (http: GET/cgiXXX) from the server monitoring unit 11 of the network camera 2, the network camera monitoring unit 42b transmits a response signal (http/1.1 200 OK) so as to be connected with the network camera 2. Also, when the network terminal monitoring unit 42a receives a registration request (http: GET/cgiYYY) from the terminal apparatus 3, the network terminal monitoring unit 42a registers user information and specific information of the network camera 2 in a connection information database of a camera information storage unit 45.

Also, in the network terminal monitoring unit 42a and the network camera monitoring unit 42b, setting information inputting/outputting units 47a and 47b have been provided respectively, and store user information transmitted from the terminal apparatus 3 in a setting information storage unit 44. Otherwise, the setting information inputting/outputting units 47a and 47b derive both specific information and user information and the access server connection information transmitted from the network camera 2, and then store the derived specific, user information, and access server connection information into the setting information storage unit 44.

As a consequence, in such a case that a connection request is issued from such a network camera 2 which is not connected to the IP network 1, the registration control server 4a transmits a server switching notification for notifying that a connection destination is changed with respect to the access control server 4b in combination with the URL, and the access control server 4b performs an access control operation after the network camera 2 has been registered in conjunction with the registration control server 4a. When an image is required from the terminal apparatus 3 while the access control server 4b is being connected to the network camera 2, the image is transmitted from the network camera 2 via the access control server 4b to the terminal apparatus 3. This connection is continued for a predetermined time, and then, is cut off after this predetermined time has elapsed. Then, this process operation is repeatedly carried out.

Figure 14:
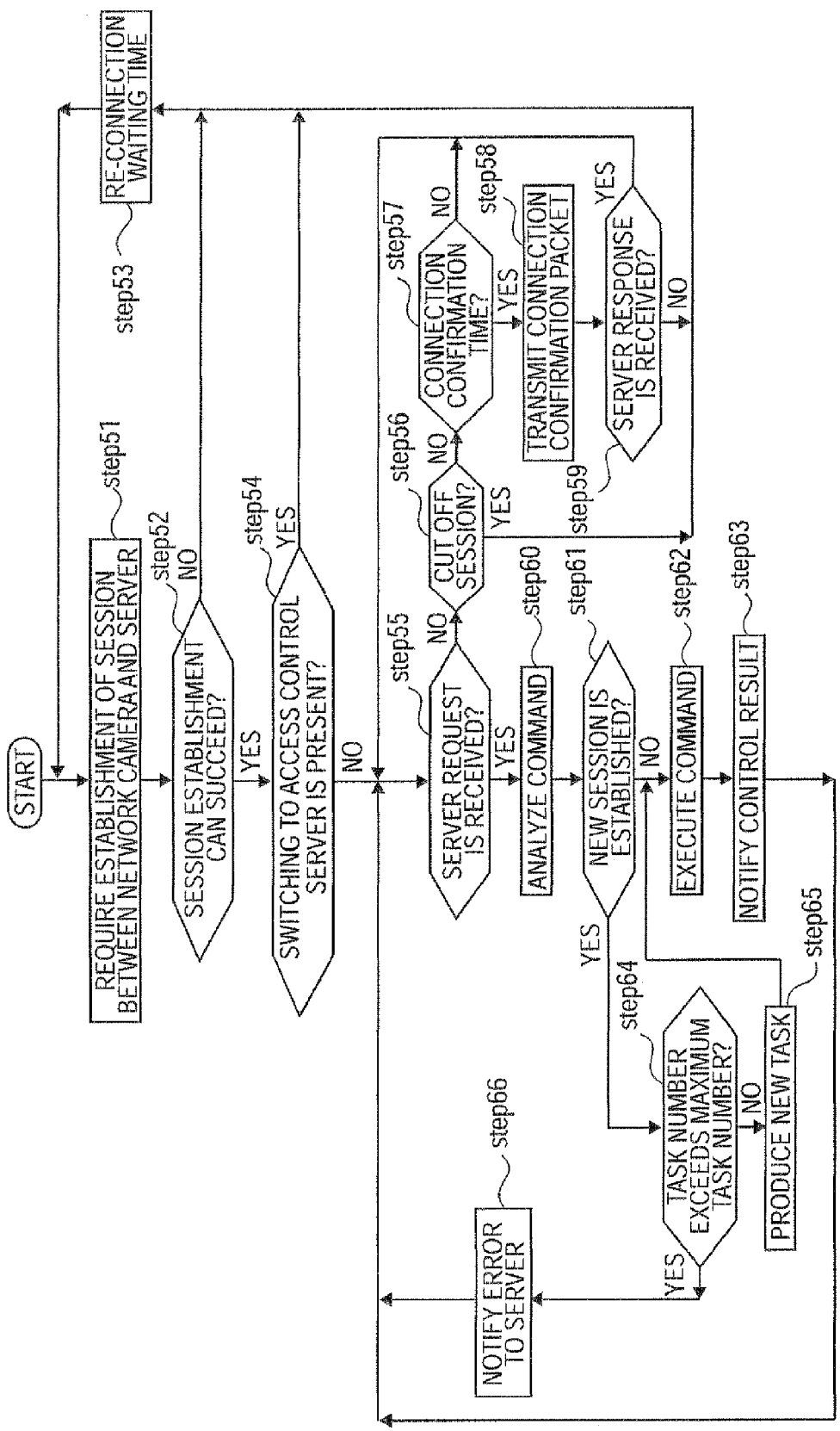
FIG. 14 is a flow chart for describing process operations of a network camera employed in the embodiment mode 2 of the present invention.

Next, a description is made of operations as to one of the above-described network cameras 2 employed in the embodiment mode 2 based upon a flow chart shown in FIG. 14. Firstly, one of the plural network cameras 2 is connected to the router 5, and the power supply thereof is turned ON so as to try to establish a session with respect to the registration control server 4a (step 51), and then, the network camera 5 accesses the registration control server 4a until the session establishment (connection) can succeed (step 52). In the step 52, if the session establishment cannot succeed, then the network camera 2 is brought into a waiting status for a re-connection time (step 53). Thereafter, the process operation is returned to the step 51 in which the network camera 2 again tries to establish a session. When the session is established, this network camera 2 is brought into a status of "Keep Alive with connection confirmation time" until the session is cut off.

When the connection establishment can succeed in the step 52, the network camera 2 judges whether or not server switching of the access control server 4b is carried out (step 54). When the access control server 4b is switched, the registration control server 4a notifies the server switching operation and the URL, and then, cuts off a line. After the re-connection wait time of the step 53 has elapsed, the network camera 2 again tries to establish a session with respect to the access control server 4b, and accesses the access control server 4b until the session establishment (connection) can succeed.

In the case that the registration control server 4a has been switched by the access control server 4b in the step 54, the network camera 2 confirms whether or not a server request is issued from the access control server 4b (step 55). In such a case that the network camera 2 cannot receive the server request, the network camera 2 judges whether or not this reception condition is caused by that the session is cut off (step 56). When the session is cut off from the access control server 4b, after a predetermined time (re-connection time) has elapsed, the process operation is advanced to the previous step 53 in order to automatically recover the session established with respect to the access control server 4b. In this step 53, the network camera 2 is brought into a waiting status for the re-connection time, and thereafter, the process operation is returned to the step 51 in which the network camera 2 again tries to establish a session.

If the session is not cut off in the step 56, then the network camera 2 can judge that this session is brought into the cut off status due to a network failure, or the like. Accordingly, the network camera 2 confirms whether or not the connection confirmation time of "Keep Alive with confirmation time" has elapsed (step 57). If the connection confirmation time has not yet elapsed, then the process operation is returned to the step 55 in which the network camera 2 waits for receiving the server request. To the contrary, when the connection confirmation time has passed in the step 56, the network camera 2 transmits a connection confirmation packet (namely, "Keep Alive request") of "Keep Alive with connection confirmation time" (step 58), and judges whether or not a server response of "Keep Alive with confirmation time" where the next time has been set is issued from the access control server 4b (step 59). In such a case that the above-described server response is issued from the access control server 4b, the process operation is returned to the previous step 55 in which the network camera 2 is brought into a waiting status until a new server request is received. To the contrary, when the above-described server response is not issued, the process operation is advanced to the step 53 in which the network camera 2 waits until the re-connection time has elapsed, and thereafter, the process operation is returned to the step 51 in which the network camera 2 again tries to establish a session.

In such a case that the server request is issued from the access control server 4b in the step 55, the network camera 2 analyzes a command contained in the server request (step 60). The network camera 2 judges whether or not this analyzed command is to require to establish a new session in addition to the present session (step 61). When the analyzed command corresponds to such a command (for example, request of JPEG data) other than the new session establishment, the network camera 2 executes this command (step 62). Then, the network camera 2 notifies a result of this control operation with respect to the access control sever 4b (step 63).

To the contrary, in such a case that the analyzed command corresponds to a command for establishing a new session in the step 61, the network camera 2 judges whether or not this task quantity is smaller than, or equal to a maximum task number, for instance, 5 pieces of task numbers (step 64). When this task quantity is smaller than, or equal to the maximum task number, the network camera 2 produces a new task (step 65), and the process operation is advanced to a step 62 in which the network camera 2 executes the command for establishing a new session, and notifies the establishment of the new session to the access control server 4b. To the contrary, when the task quantity exceeds the maximum task number in the judgment made in the previous step 64, since the network camera 2 is brought into an overload condition, the network camera 2 transmits an error notification to the access control server 4b (step 66). Then, the process operation is again returned to the previous step 55 in which the network camera 2 is brought into a waiting status until a new server request is issued.

Figure 15:
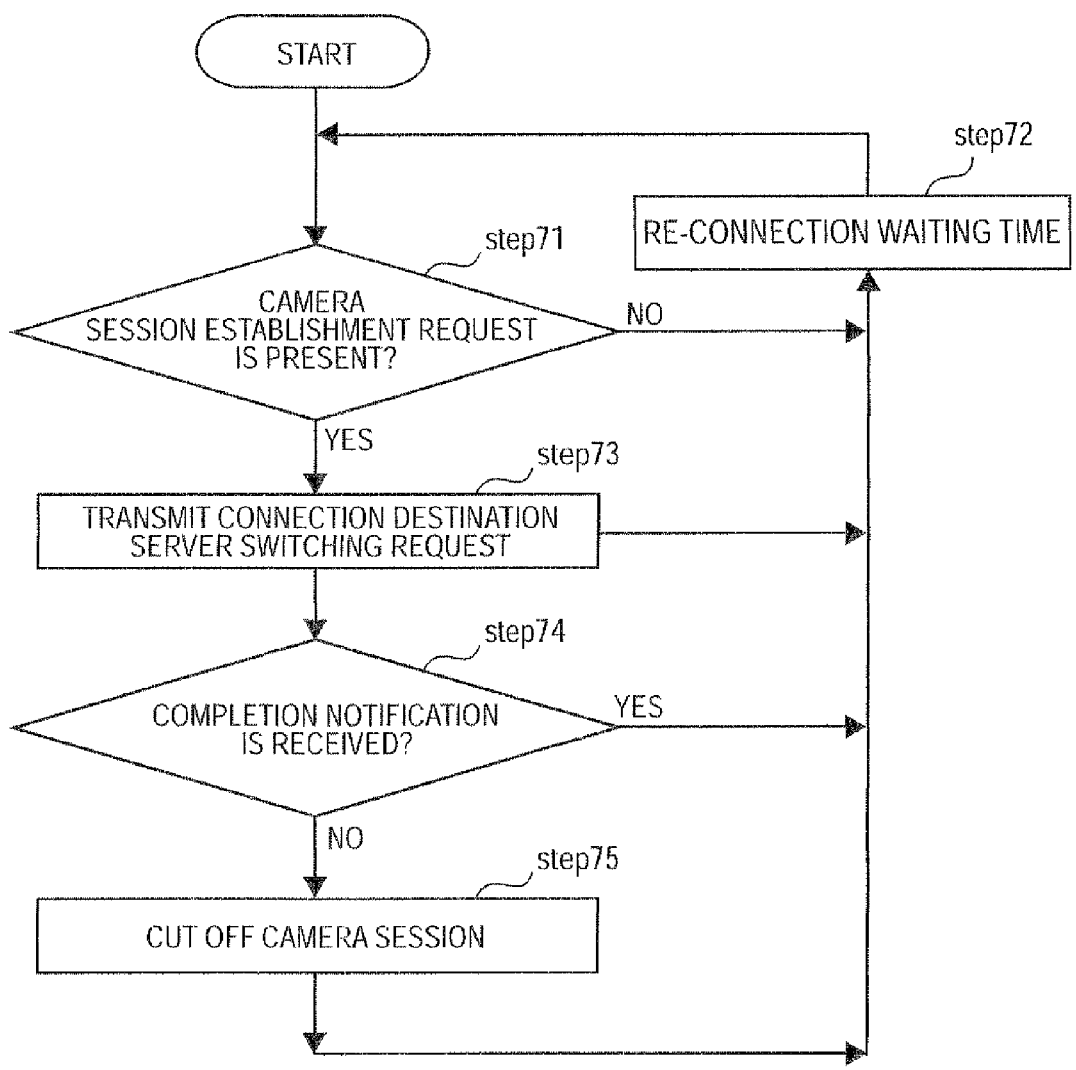
FIG. 15 is a flow chart for describing process operations of an access control server apparatus employed in the embodiment mode 2 of the present invention.

A description is made of detailed operations when the registration control sever 4a of the embodiment mode 2 performs the registering process operation with reference to a flow chart of FIG. 15. The registration control server 4a is brought into a waiting status until a camera session establishment request is issued from one of the network cameras 2 (step 71). If the camera session establishment request is not issued, then the registration control server 4a waits until a re-connection time has elapsed (step 72). To the contrary, if the camera session establishment request is issued, then the registration control server 4a notifies switching to the access control server 4b as the connection destination (step 73).

When the registration control server 4a receives a response signal (200 OK) from the network camera 2 (step 74), the registration control server 4a waits until the re-connection time has elapsed in step 72. To the contrary, when the registration control server 4a does not receive the response signal (200 OK), the registration control server 4a directly cuts off the session established with the network camera 2 (step 75), and waits until the re-connection time has elapsed in the step 72, and then, the process operation is returned to the step 71.

Figure 16:
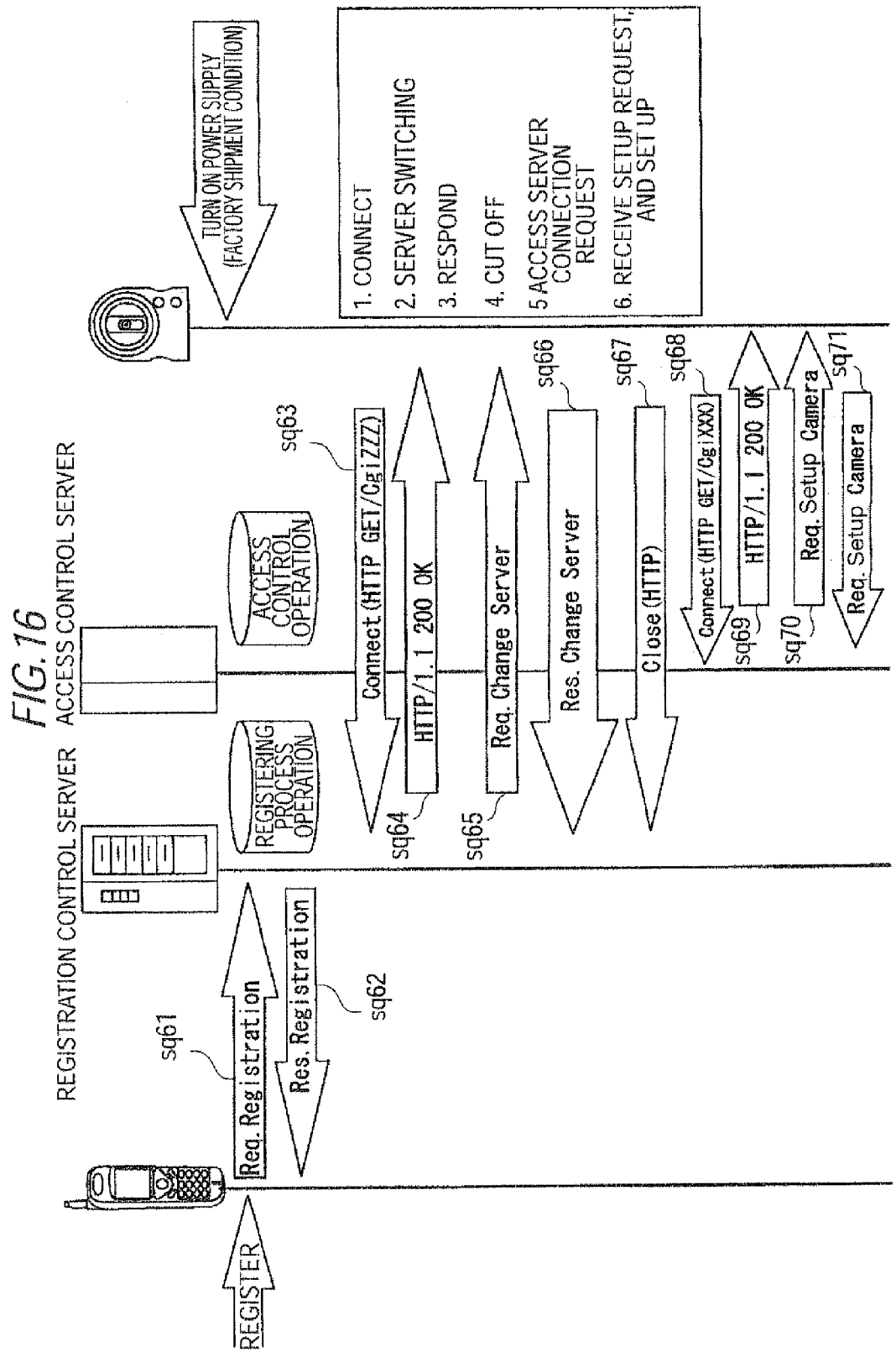
FIG. 16 is a sequential operation diagram for describing such a registering process operation that both a terminal apparatus and the network camera are newly registered with respect to the sever apparatus according to the embodiment mode 2 of the present invention.

While the arrangements and the operations of the network camera 2, the registration control server 4a, and the access control server 4b have been described, a description will be made of sequential operations executed when the registering operation is performed among four units, namely, the terminal apparatus 3, the network camera 2, the registration control server 4a, and the access control server 4. FIG. 16 indicates a registration sequence of a network system that is communicated via the registration control server 4a and the access control server 4b according to the embodiment mode 2. In FIG. 16, firstly, the terminal apparatus 3 transmits setting information in combination with a registration request (sq61), while the setting information is constituted by user information and specific information of the network camera 2. In response thereto, the registration control server 4a performs a registration processing operation, and then, notifies connection information (URL) as a registration response, while this connection information (URL) is utilized when the registration control server 4a accesses the network camera (sq62).

Thereafter, when the power supply of the network camera 2 is turned ON, the server monitoring unit 11 of the network camera 2 transmits a connection request with respect to the registration control server 4a (sq63). In the distributed server system of the embodiment mode 2, in response thereto, the registration control server 4a transmits a response signal (200, OK) so as to commence a session (sq64).

However, the registration control server 4a immediately transmits a server switching notification in combination with the URL of the access control server 4b (sq65). The network camera 2 returns a response signal to the registration control server 4a (sq66) so as to cut off the session established with the registration control server 4a (sq67). Moreover, the registration control server 4a issues a connection request to the access control server 4b by utilizing the URL of the access control server 4b (sq68). A response signal (200 OK) is transmitted from the access control server 4b (sq69), and a setup instruction of the network camera 2 is notified (sq70).

Upon receipt of the setup instruction, the network camera 2 receives the setup, and transmits a response of a setup completion to the access control server 4b (sq71).

As previously described, in the distributed server system, the registration control server 4a, and the access control server 4b, according to the embodiment mode 2, the registration control server 4a is accessed via the IP network 1 from the second terminal apparatus connected to the router 5; after the registration control server 4a establishes the session with the second terminal apparatus, the registration control server 4a causes to establish the session from the second terminal apparatus between the access control server 4b and the own control server 4a; under such a condition that this session is established, the registration control server 4a is accessed from the terminal apparatus 3 via the access control server 4b. As a result, the terminal apparatus 3 can be connected to the network camera 2.

While the access control server need not perform such a cumbersome work for setting the port forward to the router, the access control server can extremely simplify the access operation from the terminal apparatus 3 to the network camera 2 without performing such a cumbersome work that the information related to the terminal apparatus 3 is set to the network camera 2. Also, the functions have been separated from each other, namely, the registration control server 4a for performing the registering process operation, and the access control server 4b for performing the access control operation from the terminal apparatus 3 to the network camera 2. As a result, the workloads can be distributed, so that the comfortable access environment can be realized. In addition, one, or more sets of the access control servers 4b that perform the access control operations are provided in order to effectively distribute the workloads. As a result, there is no possibility that the workloads are concentrated only to a single server apparatus, so that the comfortable access environment can be realized. Then, while the load conditions when the registering process operation is performed are monitored, the monitored load conditions are reflected, and the workloads are distributed in order that a large difference is not made in the workloads given to the plural access control servers 4b. As a result, the comfortable access environment can be realized.

It should also be understood that although the embodiment modes 1 and 2 has described such an operation that the terminal apparatus 3 provided outside the LAN accesses the network camera 2 provided inside the LAN, the present invention is not limited thereto. Alternatively, such a terminal apparatus as a PC (Personal Computer) may be used instead of the network camera 2. Also, portable terminals such as portable telephones and laptop PCs may be used as the terminal apparatus 3, and alternatively, such a fixed terminal as a desktop PC may be used as the terminal apparatus 3.

Many modifications and variations of the present invention are possible in the light of the above techniques. It is therefore to be understood that within the scope of the invention, the invention may be practiced than as specifically described. The present application is based upon and claims the benefit of priorities of Japanese Patent Applications Nos. 2007-300134 and 2008-151259. The contents of which are incorporated herein by reference in its entirely.

TRANSLATION OF DRAWINGS

Figure 12:
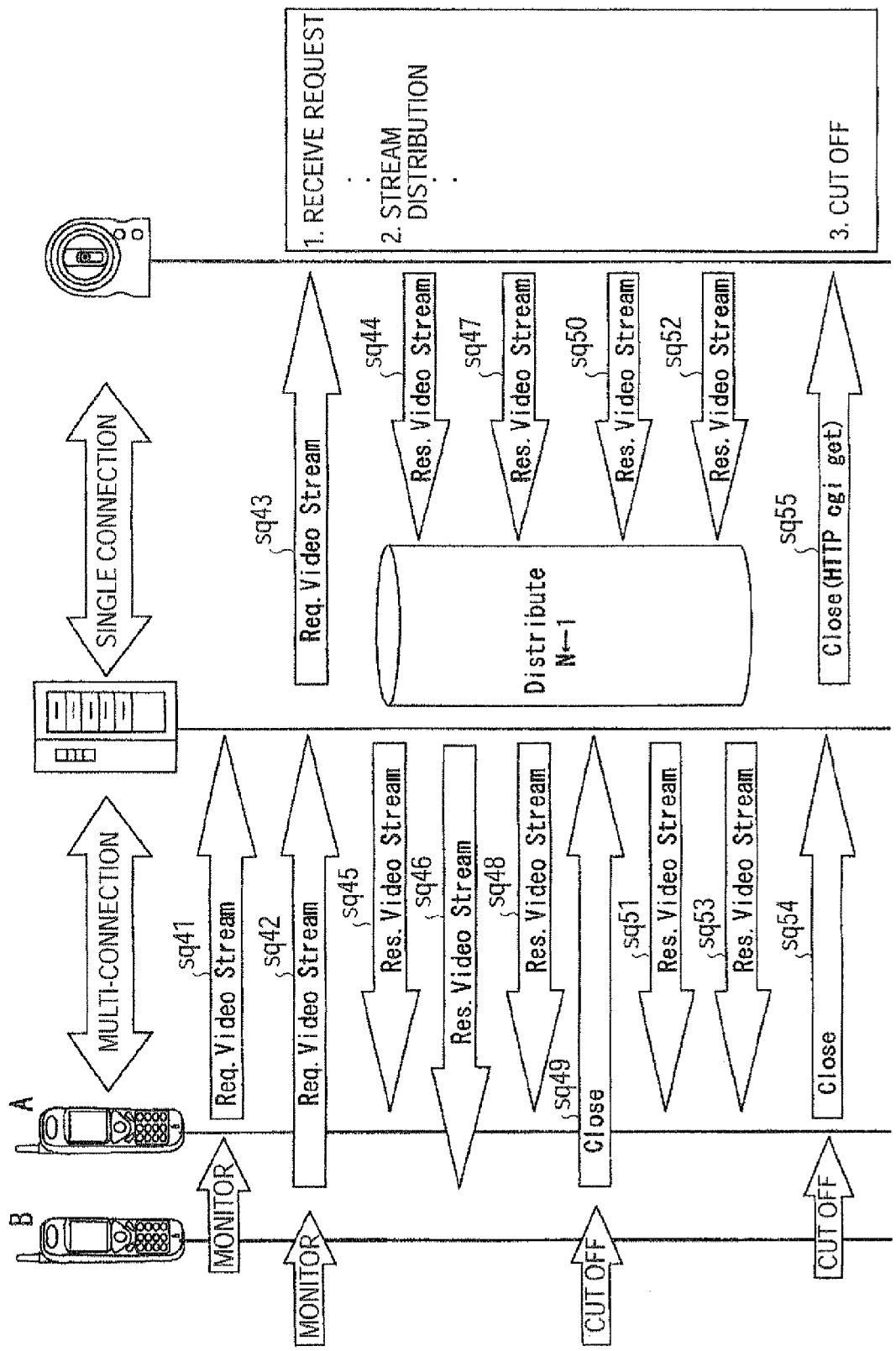
FIG. 12 is a sequential operation diagram for describing process operations in which a plurality of terminal apparatuses acquire video information from the network camera via the server apparatus according to the embodiment mode 1 of the present invention.
Figure 17:
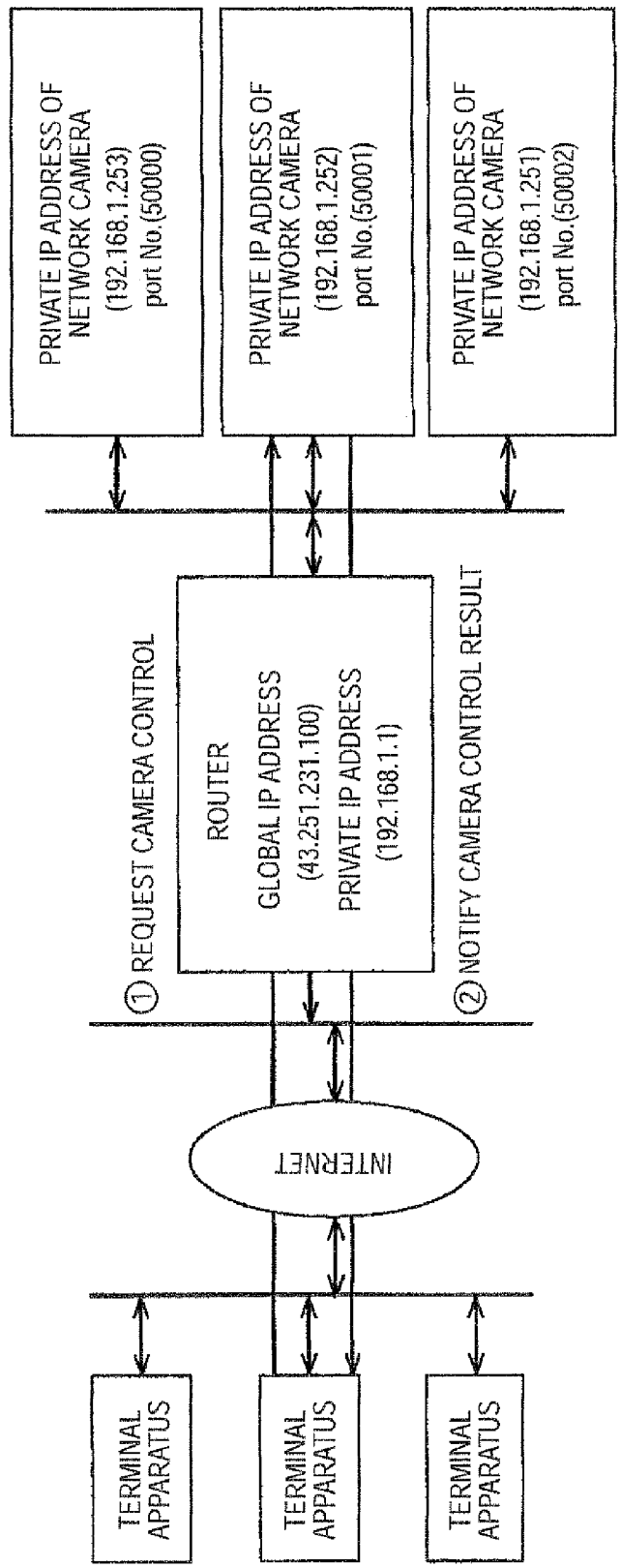
FIG. 17 is the system structural diagram of the conventional network terminal and the conventional network camera.

FIG. 1
3 terminal apparatus;
4 access control server;
1 Internet;
5 router;
2 network camera;
FIG. 2
12 camera unit;
15 microphone;
16 speaker;
19 panning operation unit;
20 tilting operation unit;
21 zooming operation unit;
22 focusing operation unit;
23 external input/output unit;
13 image processing unit;
17 voice processing unit;
24 camera control unit;
26 command analyzing unit;
27, 32 setting information input/output unit;
28 command executing unit;
10 storage unit;

14 image buffer unit;
18 voice buffer unit;
25 camera control command buffer unit;
29 server communication control unit;
30 command analyzing unit;
31 command accepting/passing control unit;
6 communication control unit;
FIG. 3
49 command analyzing unit;
50 command relaying control unit;
51 camera retrieving unit;
52, 47a, 47b setting information input/output unit;
53 camera information commonly-using control unit;
45 camera information storage unit;
46a network terminal communication control unit;
48a, 48b command accepting/passing control unit;
44 setting information storage unit;
41 communication control unit;
FIG. 4
STEPS:
1 require establishment of session between network camera and server;
2 session establishment can succeed?;
3 re-connection waiting time;
4 server request is received?;
5 cut off session?;
6 connection confirmation time?;
7 transmit connection confirmation packet;
8 server response is received?;
9 analyze command;
10 new session is established?;
11 execute command;
12 notify control result;
13 task number exceeds maximum task number?;
14 produce new task;
15 notify error to server;
FIG. 5
STEPS:
21 require establishment of camera session;
23 establish camera session;
22 re-connection waiting time;
24 terminal request is received?;
25 camera request is received?;
29 analyze command;
31 execute command;
32 notify execution result;
26, 34 transmit camera control request;
27, 36 completion notification is received?;
28 cut off camera session;
30 camera control command is received?;
33 buffered information?;
35 notify buffer information;
37 notify control result (normal condition);
38 cut off camera session;
39 notify control result (error);
FIG. 6
STEPS:
41 registration request is issued from terminal apparatus?;
42 register;
43 transmit URL;
44 registered?;
FIG. 7
70 register;
72 registering process operation;
74 turn ON power supply (under factory shipment condition);
1 connect;
2 receive request, and execute setup;
3 respond;
4 receive request (wait for next request);
FIG. 8
80 turn ON power supply;
1 connect;
2 receive request (wait with time-out time);
3 "Keep Alive with connection confirmation time";
4 repeat;
5 cut off;
8 wait for re-connection time;
FIG. 9
90 request still image;
1 receive request;
2 transmit JPEG data;
3 receive request (wait for next request);
FIG. 10
10 camera control (panning/tilting control);
1 receive request, and execute camera control (panning/tilting control);
2 respond;
4 receive request (wait for next request);
FIG. 11
1 receive request, new session;
2 respond;
12 receive request (wait for next request);
10 connect;
FIG. 12
20 monitor;
22 cut off;
24 multi-connection;
26 single connection;
1 receive request;
2 stream distribution;
3 cut off;
FIG. 13
3 terminal apparatus;
4a registration control server;
4b access control server;
100 Internet;
5 router;
2 network camera;
FIG. 14
STEPS:
51 require establishment of session between network camera and server;
52 session establishment can succeed?;
53 re-connection waiting time;
54 switching to access control server is present?;
55 server request is received?;
56 cut off session?;
57 connection confirmation time?;
58 transmit connection confirmation packet;
59 server response is received?;
60 analyze command;
61 new session is established?;
62 execute command;
63 notify control result;
64 task number exceeds maximum task number?;
65 produce new task;
66 notify error to server;
FIG. 15
STEPS:
71 camera session establishment request is present?;
72 re-connection waiting time;

73 transmit connection destination server switching request;
74 completion notification is received?;
75 cut off camera session;
FIG. 16
10 register;
12 registration control server;
14 access control server;
16 registering process operation;
18 access control operation;
20 turn ON power supply (factory shipment condition);
1 connect;
2 server switching;
3 respond;
4 cut off;
5 access server connection request;
6 receive setup request, and set up;
FIG. 17
50 terminal apparatus;
52 Internet;
54 request camera control;
56A router;
56B global IP address;
56C private IP address;
58 notify camera control result;
60 private IP address of network camera;

What is claimed is:

1. A signal relay method of a relay server for performing a relay operation between a plurality of first terminals and a second terminal via a network, the relay server including a storage section to store relay data from the second terminal, the relay server performing operations comprising:
   (a) receiving a request to receive data of the second terminal from a first one of the first terminals;
   (b) searching whether or not a second one of the first terminals previously accessed to the second terminal with a result that relay data is currently stored in the storage section;
   (c) in step (b), in a case that relay data is not currently stored in the storage section, relaying the request to the second terminal and transmitting data, received from the second terminal relating to the request, to the first one of the first terminals; and
   (d) in step (b), in a case that relay data is currently stored in the storage section, transmitting the stored relay data to the first one of the first terminals as a response to the request,
   (e) searching whether the second one of the first terminals is accessing to the second terminal when receiving a cut-off request with respect to the second terminal from the first one of the first terminals,
   (f) in step (e), in a case that the second one of the first terminals is not accessing to the second terminal, stopping the transmission of the relay data to the first one of the first terminals and transmitting the cut-off request to the second terminal, and
   (g) in step (e), in a case that the second one of the first terminals is accessing to the second terminal, stopping the transmission of the relay data to the first one of the first terminals without transmitting the cut-off request to the second terminal.

2. The signal relay method according to claim 1, wherein in step (c), the relay server keeps the received data from the second terminal after transmitting the received data to the first one of the first terminals.

3. The signal relay method according to claim 1, wherein when the relay server receives a session establish request from the second terminal, the relay server establishes the session between the relay server and the second terminal based on the session establish request, the session establish request including first specific information of the second terminal.

4. The signal relay method according to claim 3, wherein the relay server receives second specific information of the second terminal from the first one of the first terminals, and the relay server transmits connection information to the first one of the first terminals for accessing from the first one of the first terminals to the second terminal in a case that the second specific information matches the first specific information.

5. A relay server for performing a relay operation between a plurality of first terminals and a second terminal via a network, the relay server comprising:
   (a) a storage section to store relay data from the second terminal,
   (b) a receiving section that receives a request to receive data of the second terminal from a first one of the first terminals;
   (c) a searching section that searches whether or not a second one of the first terminals previously accessed to the second terminal with a result that relay data is currently stored in the storage section; and
   (d) a relay and transmitting section that: in a case that relay data is not currently stored in the storage section, relays the request to the second terminal and transmits data, received from the second terminal relating to the request, to the first one of the first terminals; and in a case that relay data is currently stored in the storage section, transmits the stored relay data to the first one of the first terminals as a response to the request,
   wherein the searching section searches whether the second one of the first terminals is accessing to the second terminal when receiving a cut-off request with respect to the second terminal from the first one of the first terminals, and, in a case that the second one of the first terminals is not accessing to the second terminal, the relay and transmitting section stops the transmission of the relay data to the first one of the first terminals and transmits the cut-off request to the second terminal, and, in a case that the second one of the first terminals is accessing to the second terminal, the relay and transmission section stops the transmission of the relay data to the first one of the first terminals without transmitting the cut-off request to the second terminal.

6. The relay server according to claim 5, wherein the relay and transmitting section keeps the received data from the second terminal after transmitting the received data to the first one of the first terminals.

7. The relay server according to claim 5, wherein the relay server further comprises a session establishing section, and when the receiving section receives a session establish request from the second terminal, the session establishing section establishes the session between the relay server and the second terminal based on the session establish request, the session establish request including first specific information of the second terminal.

8. The relay server according to claim 7, wherein the receiving section receives second specific information of the second terminal from the first one of the first terminals, and the relay and transmitting section transmits connection information to the first one of the first terminals for accessing from the first one of the first terminals to the second terminal in a case that the second specific information matches the first specific information.

* * * * *